(12) United States Patent
Nourbakhsh et al.

(10) Patent No.: US 7,478,051 B2
(45) Date of Patent: Jan. 13, 2009

(54) METHOD AND APPARATUS FOR LONG-RANGE PLANNING

(76) Inventors: Illah Nourbakhsh, 2529 Beechwood Blvd., Pittsburgh, PA (US) 15217; Tyler Morse, 421 Alvarado St., Brisbane, CA (US) 94005; David Andre, 1821 Sacramento St., Berkeley, CA (US) 94702; Ofer Matan, 310 Palo Alto Ave., Palo alto, CA (US) 94301

( * ) Notice: Subject to any disclaimer, the term of this patent is extended or adjusted under 35 U.S.C. 154(b) by 887 days.

(21) Appl. No.: 09/899,895

(22) Filed: Jul. 5, 2001

(65) Prior Publication Data

US 2002/0143599 A1 Oct. 3, 2002

Related U.S. Application Data

(60) Provisional application No. 60/281,052, filed on Apr. 2, 2001.

(51) Int. Cl.
*G06F 9/46* (2006.01)

(52) U.S. Cl. ......................................................... 705/9
(58) Field of Classification Search ...................... 705/9
See application file for complete search history.

(56) References Cited

U.S. PATENT DOCUMENTS

| | | |
|---|---|---|
| 4,510,351 A | 4/1985 | Costello et al. |
| 5,111,391 A | 5/1992 | Fields et al. |
| 5,185,780 A | 2/1993 | Leggett |
| 5,195,172 A | 3/1993 | Elad et al. |
| 5,325,292 A | 6/1994 | Crockett |
| 5,369,570 A | 11/1994 | Parad |
| 5,477,447 A | 12/1995 | Luciw et al. |
| 5,481,667 A | 1/1996 | Bieniek et al. |
| 5,659,768 A | 8/1997 | Forbes et al. |
| 5,911,134 A * | 6/1999 | Castonguay et al. ............ 705/9 |
| 5,917,485 A | 6/1999 | Spellman et al. |
| 6,021,403 A | 2/2000 | Horvitz et al. |

(Continued)

FOREIGN PATENT DOCUMENTS

EP 0 817 455 A2 1/1998

(Continued)

OTHER PUBLICATIONS erlang (E), Hargrave's Communications Dictionary, Wiley (2001). Retrieved Jun. 18, 2005, from sreferplus. http://www.sreferplus.com/entry/2720089 (1 page).*

(Continued)

*Primary Examiner*—Jeffrey A. Smith
*Assistant Examiner*—Kalyan Deshpande

(57) ABSTRACT

A method and apparatus for long-range planning. One embodiment includes a method for long-range planning for staffing in a complex environment, such as a contact center. The method includes defining at least one employee profile, wherein an employee profile comprises a group of employees that have the same skills, and wherein defining comprises specifying characteristics, including a skill set and an efficiency percentage. The method further includes defining at least one queue, specifying at least one criteria to be satisfied by a long-range staffing plan, and calculating an effect of staffing the at least one queue with the at least one employee profile, wherein the calculated effect includes a service level for the at least one queue, and an effective cost per hour.

41 Claims, 31 Drawing Sheets

U.S. PATENT DOCUMENTS

| | | | |
|---|---|---|---|
| 6,021,428 | A | 2/2000 | Miloslavsky |
| 6,044,355 | A | 3/2000 | Crockett et al. |
| 6,081,592 | A | 6/2000 | Battle |
| 6,587,831 | B1 * | 7/2003 | O'Brien .......................... 705/8 |
| 6,639,982 | B1 * | 10/2003 | Stuart et al. ............ 379/266.03 |
| 6,732,079 | B1 * | 5/2004 | Kintner et al. .................. 705/8 |

FOREIGN PATENT DOCUMENTS

| | | |
|---|---|---|
| EP | 0 863 650 A2 | 9/1998 |
| EP | 1 039 732 A2 | 9/2000 |
| EP | 1 162 814 A2 | 12/2001 |
| GB | 2 339 643 A | 2/2000 |
| WO | WO 00/08556 A1 | 2/2000 |

OTHER PUBLICATIONS erlang B formula, Hargrave's Communications Dictionary, Wiley (2001). Retrieved Jun. 18, 2005, from sreferplus. http://www.sreferplus.com/entry/2720090 (1 page).* erlang C fromula, Hargrave's Communications Dictionary, Wiley (2001). Retrieved Jun. 18, 2005, from sreferplus. http://www.sreferplus.com/entry/2720091 (1 page).*

Call Center Magazine, PGE's InVision Staff Planning system, Jul. 14, 2000, Call Center Magazine [online] [accessed Jun. 19, 2005 via URL: http:/www.callcentermagazine.com/shared/article/show.jhtml?articleld=l760037] (1 page).*

Business Editors, High-Tech Writers, Blue Pumpkin Software launches expansion into Canada, Jan. 3, 2000, Business Wire [online] [accessed Jun. 19, 2005 via Proquest database] (3pages).*

Business Wire, Blue cross and blue shield of Maine implements Blue Pumpkin PrimeTime in primary call center, Jul. 27, 1999, Buisness Wire, [online][accessed Jun. 19, 2005 via Dialog database File 20:0644626] (2 pages).*

Reynolds, Automating for better workforce management, Mar. 1999, Call Center Solutions, v.17, n.9, p. 74-80 [online][accesed Jun. 19, 2005 via Dialog database File 15:01819009] (6 pages).*

Leamon, Workforce management with skills-based call routing, Mar. 1999, Call Center Solutions, v.17, n.9, p. 88 (5 pages).*

Cleveland, How do you calculate staff?, Aug. 1999, Teleprofessional, v.12, n.8, p. 98 (1 page).*

Blue Pumpkin I, Internet Archive search for: http://blue-pumpkin.com, Jan. 28, 1998 [oneline] [retrieved Jun. 19, 2005 via archive.bibalex.org database] (33 pages).*

Blue Pumpkin II, Internet Archive search for http://blue-pumpkin.com, Apr. 21, 1998 [online] [retrieved Jun. 19, 2005 via archive.bibalex.org database] (30 pages).*

Blue Pumpkin III, Internet Archive search for http://blue-pumpkin.com, Feb. 4, 1999 [online] [retrieved Jun. 19, 2005 via archive.bibalex.org database] (17 pages).*

Blue Pumpkin IV, Internet Archive search for http://blue-pumpkin.com, Apr. 29, 1999 [online] [retrieved Jun. 19, 2005 via archive.bibalex.org database] (27 pages).*

Blue Pumpkin V, Internet Archive search for http://blue-pumpkin.com, Mar. 2, 2000 [Online] [retrieved Jun. 19, 2005 via archive.bibalex.org database] (41 pages).*

MPP (Massively Parallel Processing). Dictionary of Multimedia and Internet Applications: A Guide for Developers and Users (1999). Retrieved Jun. 23, 2005, from xreferplus.*

PrimeTime F&S User's Guide, version 1.3, 1997, 1998 (157 pages).*

Fukunaga, Staff scheduling for inbound call centers and customer contact centers, American Association for Artificial Intelligence, 2002 (9 pages).*

* cited by examiner

Big Corp Feb. 2001 - Jan 2002

File  View  Edit  Export  Help

Views
  Pre-defined Views
    Everything
    Forecasting
    Hiring
    Budgeting
  Custom Views
Queues
  RegEntry
  Tier2 Case
  Top Tier
  Create new queue
Agent Profiles
Wizards
  Configuration/Setup
    Create cost model
    Calculate accurate shrink
    New agent profile
    New queue
  Reduce costs
  Identify downside
  Anticipate future events
Events RegEntry: Voice, service goal=80% in 60 seconds

| | Feb | Mar | Apr | May | Jun | Jul | Aug |
|---|---|---|---|---|---|---|---|
| Contact volume | 380000 | 385000 | 390000 | 385000 | 410000 | 415000 | 410000 |
| % volume | 8 | 8 | 8 | 8 | 9 | 9 | 9 |
| AHT | 230 | 230 | 230 | 230 | 230 | 230 | 230 |
| Actual service | 86 | 85 | 79 | 93 | 79 | 80 | 94 |
| Required hours | 29556 | 29929 | 30315 | 29929 | 31819 | 32204 | 31819 |
| Capacity hours | 29765 | 30102 | 30264 | 30562 | 31765 | 32189 | 32522 |

Tier2 Care: Voice, service goal=90% in 45 seconds

| | Feb | Mar | Apr | May | Jun | Jul | Aug |
|---|---|---|---|---|---|---|---|
| Contact volume | 30000 | 31000 | 32000 | 31000 | 33000 | 34000 | 34000 |
| % volume | 8 | 8 | 8 | 8 | 8 | 9 | 9 |
| AHT | 220 | 220 | 220 | 220 | 220 | 220 | 220 |
| Actual service | 88 | 90 | 85 | 95 | 85 | 85 | 95 |
| Required hours | 2978 | 3059 | 3131 | 3059 | 3221 | 3295 | 3295 |
| Capacity hours | 2765 | 3106 | 3021 | 3509 | 4705 | 3252 | 3509 |

Entry level FT (RG); Shrinkage= 7.4% (Continued on Fig. 2B...)

| | Feb | Mar | Apr | May | Jun | Jul | Aug |
|---|---|---|---|---|---|---|---|
| Hires | 14 | 12 | 12 | 15 | 17 | 15 | 15 |
| In training | 0 | 0 | 0 | 0 | 0 | 0 | 0 |
| Xfer out | 0 | 4 | 0 | 0 | 5 | 4 | 6 |
| Attrition | 9 | 9 | 9 | 9 | 9 | 9 | 9 |
| Head count | 185 | 184 | 187 | 193 | 196 | 198 | 198 |
| Occupancy | 82 | 82 | 83 | 81 | 83 | 83 | 81 |

T2 full time (T2, RG); Shrinkage= 8.5%

| | Feb | Mar | Apr | May | Jun | Jul | Aug |
|---|---|---|---|---|---|---|---|
| Hires | 0 | 0 | 0 | 0 | 0 | 0 | 0 |

T2 full time (T2, RG); Shrinkage: 7.4% (Continued from Fig. 2A)

| 206 | Feb | Mar | Apr | May | Jun | Jul | Aug |
|---|---|---|---|---|---|---|---|
| In training | 0 | 0 | 0 | 0 | 0 | 0 | 0 |
| Xfer in | 0 | 4 | 0 | 0 | 5 | 4 | 6 |
| Xfer out | 0 | 0 | 0 | 0 | 0 | 0 | 0 |
| Attrition | 0 | 2 | 2 | 2 | 2 | 2 | 2 |
| Head count... | 25 | 27 | 25 | 23 | 26 | 28 | 32 |
| Occupancy | 100 | 99 | 100 | 100 | 100 | 100 | 99 |

Totals

| 208 | Feb | Mar | Apr | May | Jun | Jul | Aug |
|---|---|---|---|---|---|---|---|
| Contact volume | 417000 | 424000 | 430000 | 423000 | 450000 | 456000 | 450000 |
| Hires | 14 | 12 | 12 | 15 | 17 | 15 | 15 |
| Head count | 219 | 222 | 223 | 228 | 233 | 236 | 240 |
| Staff hours | 35040 | 35520 | 35680 | 36480 | 37280 | 37760 | 38400 |
| Total cost | 414,679 | 421,192 | 422,681 | 431,892 | 441,475 | 477,150 | 455,338 |
| Cumulative cost | 414,679 | 835,871 | 1,258,5... | 1,690,4... | 2,131,9... | 2,579,0... | 3,034,4... |

CONTINUED FROM FIG. 2A

Big Corp. Feb. 2001 - Jan 2002

BLUEPUMPKIN  File  Scenario  Views  Queues  Agent Profiles  ?

BiG CORP Feb 2001-Jan 2002 | New Scenario: Feb 2001-Jan 2002

RegEntry: Voice, service goal=80% in 60 seconds

|  | Feb | Mar | Apr | May | Jun | Jul | Aug | Sep | Oct |
|---|---|---|---|---|---|---|---|---|---|
| Contact volume | 380000 | 385000 | 390000 | 385000 | 410000 | 415000 | 410000 | 390000 | 374000 |
| % volume | 8 | 8 | 8 | 8 | 9 | 9 | 9 | 8 | 8 |
| AHT | 230 | 230 | 230 | 230 | 230 | 230 | 230 | 230 | 230 |
| Actual service | 89 | 85 | 76 | 97 | 77 | 84 | 97 | 99 | 94 |
| Required hours | 27815 | 28170 | 28535 | 28170 | 29954 | 30312 | 29954 | 27815 | 27385 |
| Capacity hours | 28135 | 28310 | 28430 | 29169 | 29886 | 30415 | 30359 | 29443 | 28000 |

Tier2 Care: Voice, service goal=90% in 45 seconds

|  | Feb | Mar | Apr | May | Jun | Jul | Aug | Sep | Oct |
|---|---|---|---|---|---|---|---|---|---|
| Contact volume | 30000 | 31000 | 32000 | 31000 | 33000 | 34000 | 34000 | 34000 | 33000 |
| % volume | 8 | 8 | 8 | 8 | 8 | 9 | 9 | 9 | 8 |
| AHT | 220 | 220 | 220 | 220 | 220 | 220 | 220 | 220 | 220 |
| Actual service | 93 | 95 | 94 | 96 | 95 | 91 | 95 | 94 | 93 |
| Required hours | 2738 | 2819 | 2904 | 2819 | 2965 | 3048 | 3048 | 3048 | 2965 |

Entry level FT (RG); Shrinkage: 8.5%

|  | Feb | Mar | Apr | May | Jun | Jul | Aug | Sep | Oct |
|---|---|---|---|---|---|---|---|---|---|
| Hires | 9 | 12 | 12 | 15 | 17 | 15 | 15 | 0 | 0 |
| In training | 0 | 0 | 0 | 0 | 0 | 0 | 0 | 0 | 0 |
| Xfer out | 0 | 4 | 0 | 0 | 5 | 4 | 6 | 0 | 0 |
| Attrition | 9 | 9 | 9 | 9 | 9 | 9 | 9 | 9 | 9 |
| Head count | 170 | 169 | 172 | 178 | 181 | 183 | 183 | 174 | 165 |
| Occupancy | 87 | 87 | 88 | 85 | 88 | 88 | 85 | 83 | 86 |

NEW SCENARIO: Feb 2001 - Jan 2002

BLUEPUMPKIN   File   Scenario   Views   Queues   Agent Profiles   ?

BIG CORP Feb 2001-Jan 2002 | New Scenario: Feb 2001-Jan 2002

Queue #1: Voice, service goal = 90% in 30 seconds

| | Feb | Mar | Apr | May | Jun | Jul | Aug | Sep | Oct |
|---|---|---|---|---|---|---|---|---|---|
| Contact volume | 350000 | 360000 | 370000 | 360000 | 360000 | 360000 | 370000 | 380000 | 390000 |
| % volume | 8 | 8 | 8 | 8 | 8 | 8 | 8 | 9 | 9 |
| AHT | 200 | 200 | 200 | 200 | 200 | 200 | 200 | 200 | 200 |
| Actual service | 0 | 0 | 0 | 0 | 0 | 0 | 0 | 0 | 0 |
| Required hours | 24559 | 25228 | 25883 | 25228 | 24559 | 25228 | 25883 | 26547 | 27215 |
| Capacity hours | 0 | 0 | 0 | 0 | 0 | 0 | 0 | 0 | 0 |

⋮

Profile #1 (Q1)

| | Feb | Mar | Apr | May | Jun | Jul | Aug | Sep | Oct |
|---|---|---|---|---|---|---|---|---|---|
| Hires | 0 | 0 | 0 | 0 | 0 | 0 | 0 | 0 | 0 |
| In training | 0 | 0 | 0 | 0 | 0 | 0 | 0 | 0 | 0 |
| Attrition | 0 | 0 | 0 | 0 | 0 | 0 | 0 | 0 | 0 |
| Head count | 0 | 0 | 0 | 0 | 0 | 0 | 0 | 0 | 0 |
| Shrinkage | 0.0 | 0.0 | 0.0 | 0.0 | 0.0 | 0.0 | 0.0 | 0.0 | 0.0 |
| Occupancy | 0 | 0 | 0 | 0 | 0 | 0 | 0 | 0 | 0 |

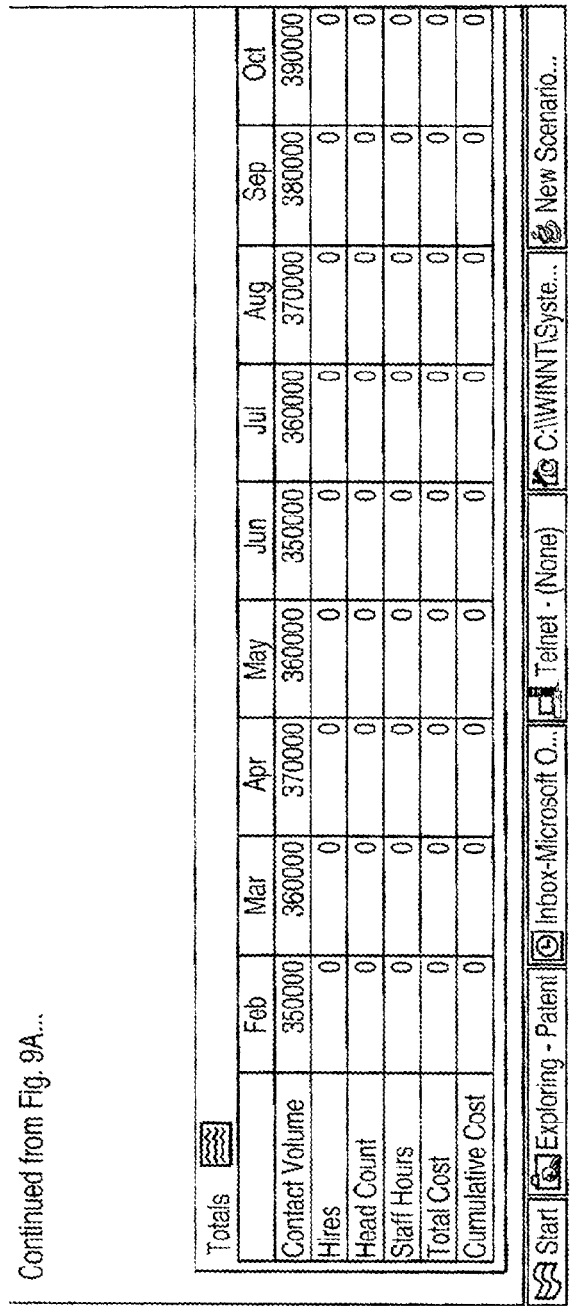
FIG. 9B

COMPARISON OF 2 SCENARIOS

File  View  Edit  Export  Help

RegEntry

| | Feb | Feb | Mar | Mar | Apr | Apr | May | May | Jun | Jun | Jul | Jul | Aug | Aug | Sep | Sep | Oct | Oct | Nov | Nov | Dec | Dec |
|---|---|---|---|---|---|---|---|---|---|---|---|---|---|---|---|---|---|---|---|---|---|---|
| Contact volume | 380... | 380... | 385... | 310... | 390... | 390... | 385... | 385... | 410... | 410... | 415... | 415... | 410... | 410... | 380... | 380... | 374... | 374... | 405... | 405... | 410... | 410... |
| % volume | 8 | 8 | 8 | 8 | 8 | 8 | 8 | 8 | 9 | 9 | 9 | 9 | 9 | 9 | 8 | 8 | 8 | 8 | 9 | 9 | 9 | 9 |
| AHT | 230 | 230 | 230 | 230 | 230 | 230 | 210 | 230 | 200 | 200 | 230 | 230 | 230 | 230 | 230 | 200 | 230 | 230 | 200 | 230 | 200 | 230 |
| Actual service | 84 | 86 | 83 | 85 | 93 | 79 | 100 | 93 | 100 | 79 | 100 | 80 | 100 | 94 | 97 | 100 | 91 | 100 | 100 | 68 | 100 | 77 |
| Required hours | 296... | 295... | 300... | 299... | 290... | 303... | 274... | 299... | 277... | 318... | 280... | 322... | 277... | 318... | 295... | 257... | 253... | 291... | 274... | 314... | 277... | 318... |
| Capacity hours | 297... | 297... | 300... | 301... | 297... | 302... | 294... | 305... | 299... | 317... | 304... | 321... | 306... | 325... | 306... | 290... | 279... | 295... | 294... | 311... | 300... | 317... |

Tier2 Care

| | Feb | Feb | Mar | Mar | Apr | Apr | May | May | Jun | Jun | Jul | Jul | Aug | Aug | Sep | Sep | Oct | Oct | Nov | Nov | Dec | Dec |
|---|---|---|---|---|---|---|---|---|---|---|---|---|---|---|---|---|---|---|---|---|---|---|
| Contact volume | 300... | 300... | 310... | 310... | 320... | 320... | 310... | 310... | 330... | 330... | 340... | 340... | 340... | 340... | 340... | 340... | 330... | 330... | 330... | 330... | 360... | 360... |
| % volume | 8 | 8 | 8 | 8 | 8 | 8 | 8 | 8 | 8 | 8 | 9 | 9 | 9 | 9 | 9 | 9 | 8 | 8 | 8 | 9 | 9 | 9 |
| AHT | 220 | 220 | 220 | 220 | 220 | 220 | 220 | 220 | 220 | 220 | 220 | 220 | 220 | 220 | 220 | 220 | 220 | 220 | 220 | 220 | 220 | 220 |
| Actual service | 86 | 88 | 88 | 90 | 94 | 85 | 100 | 95 | 100 | 100 | 100 | 85 | 100 | 95 | 100 | 97 | 100 | 92 | 100 | 78 | 100 | 85 |
| Required hours | 3034 | 2978 | 3106 | 3059 | 3185 | 3131 | 3106 | 3059 | 3276 | 3221 | 3295 | 3365 | 3295 | 3365 | 3295 | 3365 | 3276 | 322 | 3276 | 3221 | 3515 | 3465 |
| Capacity hours | 2893 | 2902 | 3040 | 3034 | 3339 | 2984 | 3906 | 3247 | 4212 | 3061 | 4334 | 3150 | 4783 | 3522 | 4699 | 3652 | 4305 | 3278 | 4092 | 2934 | 4346 | 3278 |

Top Tier

| | Feb | Feb | Mar | Mar | Apr | Apr | May | May | Jun | Jun | Jul | Jul | Aug | Aug | Sep | Sep | Oct | Oct | Nov | Nov | Dec | Dec |
|---|---|---|---|---|---|---|---|---|---|---|---|---|---|---|---|---|---|---|---|---|---|---|
| Contact volume | 7000 | 7000 | 8000 | 8000 | 8000 | 8000 | 7000 | 7000 | 7000 | 7000 | 7000 | 7000 | 6000 | 6000 | 6000 | 6000 | 7200 | 7200 | 6700 | 6700 | 7100 | 7100 |
| % volume | 8 | 8 | 10 | 10 | 10 | 10 | 8 | 8 | 8 | 8 | 7 | 7 | 7 | 7 | 7 | 7 | 9 | 9 | 8 | 8 | 8 | 8 |

Entry level FT

| | Feb | Feb | Mar | Mar | Apr | Apr | May | May | Jun | Jun | Jul | Jul | Aug | Aug | Sep | Sep | Oct | Oct | Nov | Nov | Dec | Dec |
|---|---|---|---|---|---|---|---|---|---|---|---|---|---|---|---|---|---|---|---|---|---|---|
| Hires | 14 | 14 | 12 | 12 | 12 | 12 | 15 | 17 | 17 | 17 | 15 | 15 | 15 | 15 | 0 | 0 | 0 | 0 | 0 | 19 | 17 | 17 |

Continued from Fig. 10A

| Totals | Feb | Feb | Mar | Mar | Apr | Apr | May | May | Jun | Jun | Jul | Jul | Aug | Aug | Sep | Sep | Oct | Oct | Nov | Nov | Dec | Dec |
|---|---|---|---|---|---|---|---|---|---|---|---|---|---|---|---|---|---|---|---|---|---|---|
| Contact volume | 417... | 417... | 424... | 424... | 430... | 430... | 423... | 423... | 450... | 450... | 456... | 456... | 450... | 450... | 420... | 420... | 414... | 414... | 444... | 444... | 453... | 453... |
| Hires | 14 | 14 | 12 | 12 | 12 | 12 | 15 | 15 | 17 | 17 | 15 | 15 | 15 | 15 | 0 | 0 | 0 | 0 | 19 | 19 | 17 | 17 |
| Head Count | 219 | 219 | 222 | 222 | 223 | 223 | 228 | 228 | 233 | 233 | 236 | 236 | 240 | 240 | 229 | 229 | 219 | 219 | 227 | 227 | 234 | 234 |
| Staff Hours | 350... | 350... | 355... | 355... | 356... | 356... | 364... | 364... | 372... | 372... | 377... | 377... | 384... | 384... | 366... | 366... | 350... | 350... | 363... | 363... | 374.40 | 374.40 |
| Total Cost | 414... | 414... | 421... | 421... | 422... | 422... | 431... | 431... | 441... | 441... | 447... | 447... | 455... | 455... | 434... | 434... | 415... | 415... | 430... | 430... | 443... | 443... |
| Cumulative Cost | 414... | 414... | 835... | 835... | 1,25... | 1,25... | 1,69... | 1,69... | 2,13... | 2,13... | 2,57... | 2,57... | 3,03... | 3,03... | 3,46... | 3,46... | 3,88... | 3,88... | 4,31... | 4,31... | 4,75... | 4,75... |

FIG. 10B

COMPARISON OF 2 SCENARIOS

File  View  Edit  Export  Help

RegEntry

| | Feb | Mar | Apr | May | Jun | Jul | Aug | Sep | Oct | Nov |
|---|---|---|---|---|---|---|---|---|---|---|
| Contact volume | 380000 | 385000 | 390000 | 385000 | 410000 | 415000 | 410000 | 380000 | 374000 | 405000 |
| Contact volume | 380000 | 385000 | 390000 | 385000 | 410000 | 415000 | 410000 | 380000 | 374000 | 405000 |
| % volume | 8 | 8 | 8 | 8 | 9 | 9 | 9 | 8 | 8 | 9 |
| % volume | 8 | 8 | 8 | 8 | 9 | 9 | 9 | 8 | 8 | 9 |
| AHT | 230 | 230 | 220 | 210 | 200 | 200 | 200 | 200 | 200 | 200 |
| AHT | 230 | 230 | 230 | 230 | 230 | 230 | 230 | 230 | 230 | 230 |
| Actual service | 84 | 83 | 93 | 100 | 100 | 100 | 100 | 100 | 100 | 100 |
| Actual service | 86 | 85 | 79 | 93 | 79 | 80 | 94 | 97 | 91 | 68 |
| Required hours | 29637 | 30023 | 29077 | 27427 | 27763 | 28095 | 27763 | 25796 | 25393 | 27436 |
| Required hours | 29556 | 29929 | 30315 | 29929 | 31819 | 32204 | 31819 | 29556 | 29104 | 31446 |
| Capacity hours | 29767 | 30097 | 29730 | 29476 | 29991 | 30421 | 30627 | 29055 | 27977 | 29498 |
| Capacity hours | 29765 | 30102 | 30264 | 30562 | 31765 | 32189 | 32522 | 30626 | 29559 | 31143 |

Tier 2 Care

| | Feb | Mar | Apr | May | Jun | Jul | Aug | Sep | Oct | Nov |
|---|---|---|---|---|---|---|---|---|---|---|
| Contact volume | 30000 | 31000 | 32000 | 31000 | 33000 | 34000 | 34000 | 34000 | 33000 | 33000 |
| Contact volume | 30000 | 31000 | 32000 | 31000 | 33000 | 34000 | 34000 | 34000 | 33000 | 33000 |
| % volume | 8 | 8 | 8 | 8 | 8 | 9 | 9 | 9 | 8 | 8 |
| % volume | 8 | 8 | 8 | 8 | 8 | 9 | 9 | 9 | 8 | 8 |

Entry Level FT

| | Feb | Mar | Apr | May | Jun | Jul | Aug | Sep | Oct | Nov |
|---|---|---|---|---|---|---|---|---|---|---|
| Hires | 14 | 12 | 12 | 15 | 17 | 15 | 15 | 0 | 0 | 19 |

Continued from Fig. 11A

Totals

| | Feb | Mar | Apr | May | Jun | Jul | Aug | Sep | Oct | Nov |
|---|---|---|---|---|---|---|---|---|---|---|
| Contact volume | 417000 | 424000 | 430000 | 423000 | 450000 | 456000 | 450000 | 420000 | 414200 | 444700 |
| Contact volume | 417000 | 424000 | 430000 | 423000 | 450000 | 456000 | 450000 | 420000 | 414200 | 444700 |
| Hires | 14 | 12 | 12 | 15 | 17 | 15 | 15 | 0 | 0 | 19 |
| Hires | 14 | 12 | 12 | 15 | 17 | 15 | 15 | 0 | 0 | 19 |
| Head Count | 219 | 222 | 223 | 228 | 233 | 236 | 240 | 229 | 219 | 227 |
| Head Count | 219 | 222 | 223 | 228 | 233 | 236 | 240 | 229 | 219 | 227 |
| Staff Hours | 35040 | 35520 | 35680 | 36480 | 37280 | 37760 | 38400 | 36640 | 35040 | 36320 |
| Staff Hours | 35040 | 35520 | 35680 | 36480 | 37280 | 37760 | 38400 | 36640 | 35040 | 36320 |
| Total Cost | 414,679 | 421,192 | 422,681 | 431,892 | 441,475 | 447,150 | 455,338 | 434,404 | 415,610 | 430,124 |
| Total Cost | 414,679 | 421,192 | 422,681 | 431,892 | 441,475 | 447,150 | 455,338 | 434,404 | 415,610 | 430,124 |
| Cumulative Cost | 414,679 | 835,871 | 1,258,552 | 1,690,444 | 2,131,919 | 2,579,069 | 3,034,407 | 3,468,810 | 3,884,420 | 4,314,544 |
| Cumulative Cost | 414,679 | 835,871 | 1,258,552 | 1,690,444 | 2,131,919 | 2,579,069 | 3,034,407 | 3,468,810 | 3,884,420 | 4,314,544 |

FIG. 11B

Continued from Fig. 12A...

← Fig. 12A

T2 full time (T2, RG); Shrinkage: 7.4%

| | Feb | Mar | Apr | May | Jun | Jul | Aug | Sep | Oct |
|---|---|---|---|---|---|---|---|---|---|
| In training | 0 | 0 | 0 | 0 | 0 | 0 | 0 | 0 | 0 |
| Xfer in | 0 | 4 | 0 | 0 | 5 | 4 | 6 | 0 | 0 |

Totals

| | Feb | Mar | Apr | May | Jun | Jul | Aug | Sep | Oct |
|---|---|---|---|---|---|---|---|---|---|
| Contact Volume | 417000 | 424000 | 430000 | 423000 | 450000 | 456000 | 450000 | 420000 | 414200 |
| Hires | 9 | 12 | 12 | 15 | 17 | 15 | 15 | 0 | 0 |
| Head Count | 216 | 219 | 220 | 225 | 230 | 233 | 237 | 226 | 216 |
| Staff Hours | 34560 | 35040 | 35200 | 36000 | 36800 | 37280 | 37920 | 36160 | 34560 |
| Total Cost | 412,446 | 418,959 | 420,448 | 429,659 | 439,242 | 444,917 | 453,105 | 432,171 | 413,337 |
| Cumulative Cost | 412,446 | 831,405 | 1,251,853 | 1,681,512 | 2,120,754 | 2,565,671 | 3,018,776 | 3,450,947 | 3,864,323 |

Big Corp Feb. 2001 - Jan 2002

BLUEPUMPKIN   File   Scenario   Views   Queues   Agent Profiles   ?

BIG CORP Feb 2001-Jan 2002 | New Scenario: Feb 2001-Jan 2002

RegEntry: Voice, service goal=80% in 60 seconds

| | Feb | Mar | Apr | May | Jun | Jul | Aug | Sep | Oct | Nov |
|---|---|---|---|---|---|---|---|---|---|---|
| Contact volume | 380000 | 385000 | 390000 | 385000 | 410000 | 415000 | 410000 | 380000 | 374000 | 410000 |
| % volume | 8 | 8 | 8 | 8 | 9 | 9 | 9 | 8 | 8 | 9 |
| AHT | 230 | 230 | 230 | 230 | 230 | 230 | 230 | 230 | 230 | 230 |
| Actual service | 89 | 85 | 76 | 97 | 77 | 84 | 97 | 99 | 94 | 97 |
| Required hours | 27815 | 28170 | 28535 | 28170 | 29954 | 30312 | 29954 | 27815 | 27385 | 31815 |
| Capacity hours | 28135 | 28310 | 28430 | 29169 | 29886 | 30415 | 30959 | 29443 | 28000 | 32817 |

Tier2 Care: Voice, service goal=90% in 45 seconds

| | Feb | Mar | Apr | May | Jun | Jul | Aug | Sep | Oct | Nov |
|---|---|---|---|---|---|---|---|---|---|---|
| Contact volume | 30000 | 31000 | 32000 | 31000 | 33000 | 34000 | 34000 | 34000 | 33000 | 34000 |
| % volume | 8 | 8 | 8 | 8 | 8 | 9 | 9 | 9 | 8 | 9 |
| AHT | 220 | 220 | 220 | 220 | 220 | 220 | 220 | 220 | 220 | 220 |
| Actual service | 93 | 95 | 94 | 96 | 95 | 91 | 95 | 94 | 93 | 94 |
| Required hours | 2738 | 2819 | 2904 | 2819 | 2965 | 3048 | 3048 | 3048 | 2865 | 3048 |

BLUE PUMPKIN LONG TERM PLANNING REPORT: Performance Summary

Scenario: BIG CORP (2)

Calculations based on FTE hours/month: 160

Service Level uses service time (sec): 20

Contact Center Performance Summary:

| | Contact Statistics | | | | | | Staffing | | | | | | | Performance | | | |
| | Plan | | Actual | | | | Plan | | | Actual | | | Plan | | | Actual |
| | Volume | AHT | Volume | AHT | %Volume | | Req hrs | Req FTEs | Avl hrs | Avl FTEs | Headcnt | Hdcnt | %Hdcnt | Calls/Head | Occup | Svc Level | Svc Level |
|---|---|---|---|---|---|---|---|---|---|---|---|---|---|---|---|---|---|
| Mar-00 | 408,000 | 350 | 407,000 | 360 | -0.2% | | 12,500 | 78.1 | 12,400 | 77.5 | 110 | 109 | -0.9% | 3709 | 80% | 92% | 90% |
| Apr-00 | 410,000 | 350 | 411,000 | 360 | 0.2% | | 12,600 | 78.8 | 12,500 | 78.1 | 120 | 122 | 1.6% | 3417 | 85% | 91% | 88% |
| May-00 | 405,000 | 350 | 409,000 | 365 | 1.0% | | 12,680 | 79.3 | 12,500 | 78.4 | 122 | 121 | -0.8% | 3320 | 78% | 89% | 85% |
| Jun-00 | 395,000 | 350 | 405,000 | 362 | 2.5% | | 12,740 | 79.6 | 12,500 | 78.1 | 120 | 115 | -4.3% | 3292 | 77% | 89% | 83% |
| Jul-00 | 380,000 | 380 | | | | | 12,990 | 81.2 | 13,000 | 81.3 | 140 | | | 2714 | 75% | 90% | |
| Aug-00 | 380,000 | 380 | | | | | 13,200 | 82.5 | 13,200 | 81.6 | 145 | | | 2621 | 80% | 89% | |
| Sep-00 | 385,000 | 350 | | | | | 13,100 | 81.9 | 13,050 | 81.3 | 140 | | | 2750 | 80% | 89% | |
| Oct-00 | 395,000 | 340 | | | | | 13,150 | 82.2 | 13,000 | 81.3 | 140 | | | 2821 | 82% | 86% | |
| Nov-00 | 400,000 | 340 | | | | | 13,240 | 82.8 | 13,200 | 82.5 | 145 | | | 2759 | 83% | 90% | |
| Dec-00 | 410,000 | 340 | | | | | 13,280 | 83.0 | 13,100 | 81.9 | 145 | | | 2828 | 86% | 86% | |
| Jan-01 | 420,000 | 340 | | | | | 13,300 | 83.1 | 13,000 | 81.3 | 145 | | | 2897 | 85% | 85% | |
| Feb-01 | 425,000 | 340 | | | | | 13,280 | 83.0 | 13,200 | 82.5 | 150 | | | 2833 | 82% | 89% | |
| Mar-01 | 420,000 | 330 | | | | | 13,290 | 83.1 | 13,300 | 83.1 | 155 | | | 2710 | 70% | 90% | |
| Total | 5,233,000 | | 1,632,000 | | | | 169350 | | 167800 | | | | | | | | |
| Min | 380,000 | 330 | 405,000 | 360 | -0.2% | | 12500 | 78 | 12400 | 78 | 110 | 109 | -4.3% | 2621 | 70% | 85% | 83% |
| Max | 425,000 | 380 | 411,000 | 365 | 2.5% | | 13300 | 83 | 13300 | 83 | 155 | 122 | 1.6% | 3709 | 86% | 92% | 90% |
| Ave | 402,538 | 349 | 408,000 | 362 | 0.9% | | 13027 | 81 | 12908 | 81 | 137 | 117 | -1.1% | 2975 | 80% | 89% | 87% |

FIG. 14A

| AVERAGE WAGE | BURDEN | SUMMARY |

| | |
|---|---|
| 401K | 2 % |
| INSURANCE | 6 % |
| WORKER'S COMP | 5 % |
| FUTA | 3.3 % |
| BONUS | 0 % |
| OTHER | 0 % |
| TOTAL | 16.3 % |

OK

CANCEL

FIG. 16

| PROFILE | AVG. WAGE | TOTAL BURDEN | PAID/WORK... | COST/SCHED... | COST/AGENT/... |
|---|---|---|---|---|---|
| ENTRY LEVEL FT | 10.0 | 1.163 | 1.0819672... | 12.583278... | 2013.3245... |
| T2 FULL TIME | 11.0 | 1.163 | 1.0723542... | 13.718627... | 2194.9803... |
| T3 FULL TIME | 11.5 | 1.163 | 1.0619658... | 14.203261... | 2272.5218... |
| PART TIME H... | 12.0 | 1.163 | 1.0780911... | 15.045839... | 601.83357... |

FIG. 17

| GENERAL | SHRINKAGE |

PROFILE NAME           ENTRY LEVEL FT
PROFILE ABBREVIATION   FT 1
☑ CAN HIRE INTO THIS PROFILE
    REQUIRES [4] WEEKS OF TRAINING TO HIRE IN
☐ CAN TRANSFER INTO THIS PROFILE
☑ CAN TRANSFER OUT OF THIS PROFILE

FTE HOURS PER MONTH    160
FTE HOURLY WAGE        10.00
AGENT EFFICENCY        80 %
INITIAL HEADCOUNT      180 AGENTS

RegEntry          RegEntry
Tier2 Care
Top Tier ( ADD >> )
( << REMOVE )

( CANCEL )  ( OK )

FIG. 18

| | | |
|---|---|---|
| ○ SPECIFY SHRINKAGE PER MONTH | | |
| ⦿ SPECIFY SHRINKAGE FOR ENTIRE SCENARIO | | |

PLANNED SHRINKAGE
| | | |
|---|---|---|
| VACATION | 2 | % |
| BREAKS | 0.2 | % |
| TRAINING | 4 | % |
| NON-CONTACT ACTIVITY | 1 | % |
| OTHER PLANNED SHRINKAGE | 0 | % |
| TOTAL PLANNED SHRINKAGE | 7.2 | % |

UNPAID ABSENTEEISM
| | | |
|---|---|---|
| UNPAID SICK/PERSONAL | 1 | % |
| UNPAID OTHER | 0 | % |
| TOTAL UNPAID ABSENTEEISM | 1 | % |

PAID ABSENTEEISM
| | | |
|---|---|---|
| PAID JURY/FMLA | 0.3 | % |
| PAID OTHER | 0 | % |
| TOTAL PAID ABSENTEEISM | 0.3 | % |

| | | |
|---|---|---|
| TOTAL SHRINKAGE | 8.5 | % |

METHOD AND APPARATUS FOR LONG-RANGE PLANNING

RELATED APPLICATIONS

This patent application claims priority from U.S. Provisional Patent Application Ser. No. 60/281,052, entitled The Long Range Planner Software Product, filed Apr. 2, 2001.

FIELD OF THE INVENTION

The invention is in the field of software tools that predict the effect of proposed long-range plans on complex systems.

BACKGROUND

Managers and administrators of many types of complex systems routinely try to produce long-range plans for the enterprise. An effective long-range plan should predict future conditions, the types of ongoing actions needed to meet those conditions, and the costs and relative effectiveness of the ongoing actions. One objective of an effective long-range plan is to reduce the expenditure of time and money by an enterprise while maximizing efficiency and profit. One example of a complex system is a consulting enterprise that performs many types of work for many types of client using many types of employees. Significant long-range planning challenges for a consulting enterprise include predicting work loads and types of work loads, and predicting hiring and training needs.

A contact center is a complex system that provides a good example of the requirements for effective long-range planning. A contact center is an organization that responds to incoming contacts from customers of an enterprise. The incoming contacts are via any one of a number of contact media, such as telephone calls, email, fax, web chat, voice over internet protocol, and call backs. An agent is an employee that is trained to respond to various contacts according to both the content and the medium of the contact. Each agent can have a different skill set. For example, one agent may be trained to answer live telephone help inquiries regarding certain products, respond to email regarding certain products, receive telephone purchase orders for certain products, etc. Typically, incoming contacts are assigned to different queues based upon the content and/or medium of the contact. In embodiments of the invention, contact queues are divided into at least two types of queues. For example, one type of queue is an immediate queue for contacts that can be abandoned and should be responded to in real-time, such as telephone calls. Another type of queue is a deferred queue for contacts that cannot be abandoned (at least not immediately) and should be responded to within some time period after receipt, such as email or fax. Queues may be defined in any other way, such as by the required level of service on a particular queue, where a common measure of service level is a percentage of calls answered within a defined time period. An agent may be assigned to multiple queues within a time period. A queue typically handles one type of contact requiring a particular skill or skills. The possible number of agent skill sets includes every permutation of combinations of the existing skills in the organization. Each agent has a particular skill set, but the skill sets among different agents may overlap.

Enterprises operating contact centers must schedule agents carefully in order to provide a required level of service on each queue at the lowest overall cost. A poor schedule could leave many calls unanswered, or leave many paid agents idle. Existing scheduling and forecasting tools are designed to create work schedules for the agents currently available. Schedules are typically created for no more than four weeks in advance. Existing scheduling and forecasting tools account for such specifics as a particular agent's vacations, proficiency and availability. The scheduling tools attempt to maximize service level by intelligently scheduling available agents. Existing scheduling tools, however, do not provide guidance for long-range planning. Scheduling tools guide day-to-day staffing decisions given a fixed set of resources, but do not help an administrator intelligently plan future hiring and training decisions. For example, scheduling tools do not allow an administrator to see the effects of scheduling, hiring, and training decisions on queue service levels or costs.

To conduct long-term planning with traditional scheduling tools, users typically create a "virtual week" far in the future, and add artificial agents to a schedule. Scheduling is then performed, while varying parameters to conduct "what-if" studies. This approach is inadequate for accurate long-range planning for several reasons. For example, the period of time available for scheduling is too short to be of use for long-range planning. This is a fundamental inadequacy, in that long-term planning spans several months, rather than the two to four weeks available with current tools. This leads to inaccurate results, in part because seasonal and yearly variations cannot be captured by the tool. A direct result of this temporal mismatch is that long-term hiring plans and training plans cannot be created using the traditional approach to long-term planning. Therefore, traditional scheduling and forecasting approaches at their best are only usable for estimating staff hours required, but are not usable for the creation of hiring and training plans.

Another reason traditional scheduling approaches are inadequate for accurate long-range planning is that they are unnecessarily time-consuming. One of the reasons for this is that traditional tools deal with atomic temporal units ranging from five minutes to fifteen minutes. This is too fine-grained for conducting long-term planning and, as a result, the scheduling engine, which is busy identifying artificial agents' starting and ending shift times with fifteen minute precision, is unnecessarily slow. Another reason is that traditional tools include parameters that are insignificant in the creation of long-term plans, yet the user is forced to specify these parameters and thus waste time while conducting long-term planning. Examples of such parameters include the specific distribution of breaks in a particular shift, unnecessarily precise information regarding an agent's unavailability, proficiency and shift preferences, etc.

Yet another reason traditional scheduling approaches are inadequate for accurate long-range planning is that they provide no scheduling-free solution to the problem of computing performance. In the case of skill-based contact centers, there is no traditional system that can estimate the performance of the contact center based on total headcount numbers without launching into a complete scheduling session, in which agents are scheduled and the resulting schedule's performance is measured. This is time-consuming and inefficient. Also, because the performance that is measured is over a short period, traditional scheduling methods probably generate inaccurate performance measurements of long-range staffing plans.

There are existing long-term forecasting tools which are used to estimate the volume of calls or contacts that will be expected months and years into the future. These are trend analysis tools, in that they enable the user to incorporate prior historical data in the exercise of creating seasonal, monthly, weekly and daily trends. Once these trends have been created, they are applied forward in time based on current contact or call statistics to yield estimates of incoming call volumes for future months over a long term. Although this process can successfully estimate future call volumes, the long term forecasting tool is inadequate for more complete long-term planning for several reasons. One reason is that long-term forecasting provides no estimate of staffing hours required, especially in a skills-based environment. Another reason long-term forecasting is inadequate for more complete long-term planning is that existing long-term forecasting tools provide no estimate of performance (such as service level and queue occupancy) given headcount. Another inadequacy is that existing long-term forecasting has no mechanism for constructing hiring or training plans. Yet another inadequacy is that long-term forecasting has no mechanism to enable the user to assess the impact of making structural changes to the contact center (e.g. splitting a queue or adding a queue).

SUMMARY OF THE DISCLOSURE

A method and apparatus for long-range planning are described. One application of the method and apparatus is long-range planning for staffing in a complex environment, such as a contact center. One embodiment of long-range planning in a contact center provides easy visualization of the effects of a proposed long-range plan. For example, consequences of strategic decisions regarding changes to head count, training, contact volume and other contact center statistics can be easily viewed. The long-range planning includes a user interface that receives information that defines decisions regarding a proposed long-range plan, and transparently operates on the information received using particular algorithms. The long-range planning quickly determines the impact of each decision on contact center performance, including service levels per type of work load. In a call center context a work load can be a queue, and the long-range planning determines service level per queue and agent occupancy per queue. Functionality of the long-range planning for a call center includes: long-range forecasting; headcount planning; contact center statistics forecasting; training planning; cost modeling; cost-of-plan calculation; skill-based planning; multi-contact planning; a what-if comparison tool; a plan-based editor; an Excel™-based reporting; a point of view (POV) customization; localization-based customization of fields; a plan creation Wizard; and an intelligent advisor.

BRIEF DESCRIPTION OF THE DRAWINGS

FIG. 2A is a user interface screen of an embodiment. The screen shot continues in FIG. 2B.

FIG. 9A is an illustration of a user interface screen that allows tabbing between different scenarios. The screen shot continues in FIG. 9B.

FIG. 10A is an illustration of a user interface screen that shows interleaved column grids from different scenarios. The screen shot continues in FIG. 10B.

FIG. 11A is an illustration of a user interface screen that shows interleaved row grids from different scenarios. The screen shot continues in FIG. 11B.

FIG. 16 is an illustration of a user interface screen for creating a cost model in one embodiment.

FIG. 17 is an illustration of a user interface screen for creating a cost model in one embodiment.

FIG. 18 is an illustration of a user interface screen for creating a profile in one embodiment.

FIG. 19 is an illustration of a user interface screen for creating a profile in one embodiment.

FIG. 21 is an illustration of a user interface screen of a Wizard process in one embodiment.

DETAILED DESCRIPTION

A method and apparatus for long-range planning are described. The method and apparatus are applicable to any complex system that allocates various resources to various work loads. One embodiment is a method for generating the effects of proposed long-range plans on a contact center that handles multiple queues and multiple contact media. The method takes as input a variety of information about a proposed long-range plan. The information includes multiple employee (employee and "agent" will be used interchangeably herein) profiles, expected call volumes per queue, average handling times per queue, required hours per queue, and required service levels per queue. Employees can have any combination of skills. For example, employees may be skilled in handling one or more types of queues and/or one or more types of contact media. The method produces a detailed report of the effects of the proposed long-range plan, including "actual" service levels per queue and "actual" capacity hours. The method further produces cost forecasts based on the input information, including an effective cost per hour and projected training costs.

Figure 1:
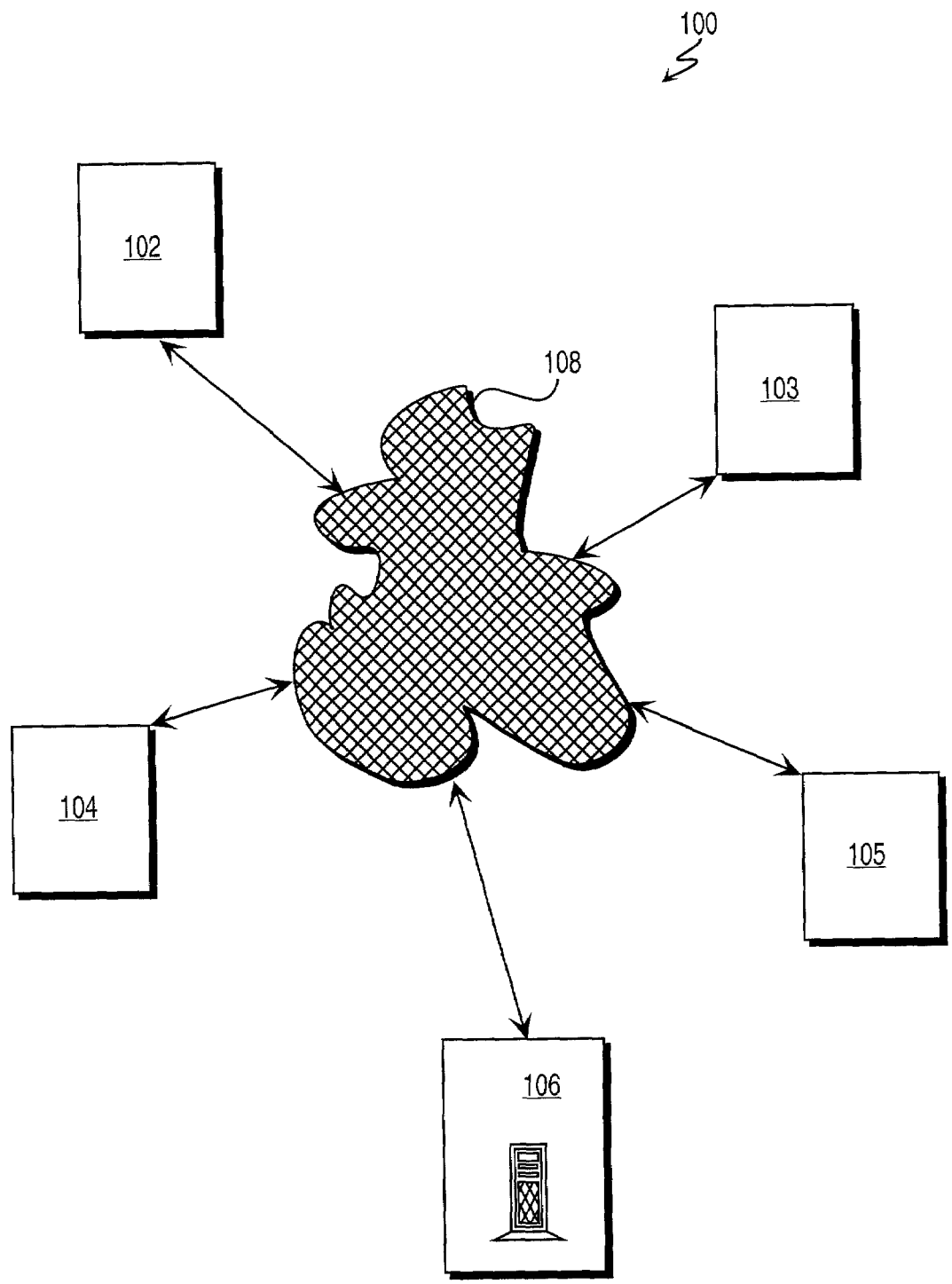
FIG. 1 is a block diagram of an embodiment of a system for multi-contact schedule generation.

FIG. 1 is an embodiment of a system 100 for long-range planning. The system includes multiple client computers 102-105, which are coupled to the server 106 through a network 108. The network 108 can be any network, such as a local area network, a wide area network, or the Internet. The client computers each include one or more processors and one or more storage devices. Each of the client computers also includes a display device, and one or more input devices. The server 106 includes one or more storage devices. All of the storage devices store various data and software programs. In one embodiment, methods for long-range planning are carried out on the system 100 by software instructions executing on one or more of the client computers 102-105. The software instructions may be stored on the server 106 or on any one of the client computers. For example, one embodiment is a hosted application used by a contact center of an enterprise that requires long-range staffing planning for many employees, or agents. The software instructions are stored on the server and accessed through the network by a client computer operated by the enterprise. In other embodiments, the software instructions may be stored and executed on the client computer. Data required for the execution of the software instructions can be entered by a user of the client computer through a specialized user interface. Data required for the execution of the software instructions can also be accessed via the network and can be stored anywhere on the network.

The long-range planning method and apparatus include various functions accessible through a user interface as described below. One of the functions is preliminary long-range plan design, including payroll planning. The hiring strategy and training strategy for a contact center is planned for a coming year, and the impact of decisions on contact center performance and payroll costs are viewed. This requires a temporal horizon of up to 3 years. This process includes creation of a long-range forecast, computation of the required future headcount and planning hiring and training to achieve the best possible headcount subject to payroll constraints.

"What-if" structural and non-structural evaluations are also accessible functions. "What-if" evaluations facilitate the consideration of both major and minor changes to next year's plan, including changing the distribution of agent skills, changing the outsourcing model, altering the training program, etc. "What-if" evaluations allow the impact of possible changes on head count needs, quality of service and cost to be viewed.

Another accessible function allows an administrator to intelligently strategize call center changes, particularly in compensation areas such as hiring plans and training plans. The user enters planned projections, and can view the deviations of a proposed plan from those projections. The user makes changes on portions of the plan based on new information and views the impact of these corrections. There are simple work-flows for making the same change to multiple plans that have temporal intersection with one another.

The user may make a skill-based representation of a strategic plan. In one embodiment, the long-range planner operates in a skills-based setting. Contact statistics such as volume, average handling time (AHT), and service goals are viewed and edited on a queue-by-queue basis. Hiring and training are visualized based on skill set-based groupings of agents. Multi-contact functionality is also available. Each queue can be annotated as a standard phone or chat queue, or alternatively as a deferred queue (e.g., e-mail or fax).

In one embodiment, the temporal granularity of long-range planning is monthly. When creating or modifying a plan, the user defines a period of time, in months, for planning. There is no reason for artificial bounds to be placed on the maximum size of this time period. The long-range planner can be used to view the effects of proposed one year plans, or three to five year plans.

Long-range forecast generation is possible, such as monthly incoming volume forecasts specifiable on a queue-by-queue basis given AHT. Multiple sources of information are generally collected in the creation of a long-range forecast (e.g. marketing input, historical data, and executive goals). Optionally, the user interface facilitates the fusion of data from multiple sources, with clear pointers back to the sources via text explanations. Trend-based forward forecasts, profile acquisition, and raw value acquisition using historical data are available functions.

Variations (e.g. spikes in call volume) are justified by special events such as holidays or catalog drops or marketing product introductions. For such variations, a tool for creating events and clearly labeling the cause of each such event is available.

For headcount planning and need calculation, the user specifies a variety of aspects of planned and unplanned shrinkage and inefficiency (e.g. absenteeism, recurrent training, vacation, etc.). In addition, the user specifies overall work hours of a full-time agent. Based on these values, the service goals and the volume forecast, an estimate of the staffing hours need on a per-queue basis is produced.

Actual staffing hours are calculated based on an attrition specification, a hiring plan specification, a training specification, and skills. The attrition specification allows a separate attrition rate for hires and for live agents.

A training specification can be as simple as the amount of core training time required to take a new hire live. Training plan specification includes estimates of incoming headcount and outgoing headcount. Outgoing headcount refers to individuals leaving a skill group/staff profile to begin training for work in another staff profile. All headcount values are be viewed on a staffing-profile-specific basis. In one embodiment, a staffing profile, or profile, is a group of hypothetical agents that share the same set of skills. A profile could be defined in other ways as necessary, for example, as a group of hypothetical agents that have the same associated costs.

Performance estimates are provided on a queue-by-queue basis by showing the disparity between staffing hours need and staffing hours achieved as well as the expected service level and profile-by-profile occupancy.

Cost computation and reporting capabilities are provided. Cost estimates are possible using a computation of actual cost per scheduled staff hour. This computation is based upon payroll wage distribution, payroll burden and the proportion of hours paid to hours worked (computed based on specified values of unpaid absenteeism, planned shrinkage, paid absenteeism and holidays). Actual cost per schedule staff hour is computed, as well as burden proportion and work cost (hours paid/hours worked ratio, or "paid/work ratio"). Specificity at the level of each group is allowed so that characteristics such as for example, training due to shrinkage, can vary among groups. A final budget visualization shows these variable costs and allows for inclusion of multiple user-defined rows to contain one-time and miscellaneous costs that are added directly to the computed values. The budget computation allows changes to the budget model mid-year in a single plan. Examples are allowing a planned salary increase in average per-head loaded cost, or a planned training for a product's new version release.

Inter-plan copy/paste functionality is also provided. Users will frequently transfer data from one plan to another. Entire segments of data, for instance, subsets of volume forecast and hiring plans, have copy/paste functionality. The copy/paste functionality is not only across queues and staffing profiles, but also across plans.

Users of the long-range planner vary from a call center manager to a director to a vice president. Activities or processes are provided for both limiting visibility to the appropriate data and for guiding actions to an appropriate best use of the long-range planner. A generic view tool enables visibility or suppression of any rows or columns of data in order to focus user attention on the desired data.

One embodiment includes a "Wizard" accessible to the user through the user interface. The Wizard interacts with the user to guide the user through many of the functions of the long-range planner. A series of work-flows covering all of the major available activities of the long-range planner provide best practice approaches for each individual activity. The Wizard provides direct hyperlinks with continuation into the long-range planner. In complex parametric cases, the Wizard offers an alternative to filling out complex information directly. Instead, the Wizard offers a questionnaire; when the user completes the questionnaire the appropriate grid parameters are automatically specified. The activities that are implemented as part of the Wizard system include: configuration/setup; creation of cost model; calculation of accurate shrinkage; estimation of schedule efficiency; adding new queue; adding new agent profile; creating hiring plan; what-if; optimizing the contact center, including reducing costs; lowering AHT, including training and mentoring; cross-skilling agents strategically; increasing schedule efficiency; conducting sensitivity analyses, including identifying downsides; contacting volume forecast; agent shrinkage sensitivity; agent proficiency; anticipating new events; specifying need-spiking events; compensating with agent shrinkage; and planning part-time help.

For a subset of the activities, an "intelligent advisor" begins with a questionnaire, then searches over possible long-range plans to effectively experiment with thousands of what-if scenarios in a matter of seconds. The intelligent advisor returns a set of recommended alternatives for improving contact center performance, resonant with the chosen activity. Some of the intelligent advisor activities are as follows: given demand and goals, construct a hiring plan; in a skilled environment, construct a cross-training plan; in a skilled environment, recommend optimal skill sets (profiles); and conduct a sensitivity analysis/risk assessment evaluation of the contact center.

One embodiment of the long-range planner includes an event planner with which a user is able to define an event, with temporal specification. Thereafter, the user specifies the impact of the event on the contact center in terms of contact center statistics, such as volume forecast ramps or AHT spikes, as well as agent statistics such as training, shrinkage, and temporary changes. The user is notified of the event in the long-range plan and is able to conduct cost impact and service level impact studies by moving the event to different months.

The user interface of the long-range planner is compatible with many existing, common software tools, such as Excel™. For example, users can conveniently import data from Excel™ to the long-range planner. Data in an internal representation can be exported to other tools, such as Excel™.

As shown in FIGS. 2A-2B, the main interface 200 of one embodiment consists of sets of grids in a central screen area. Three panes 204, 206, and 208 are positioned in a large column, with a fourth menu pane 202 to the left of the column. The top pane 204 contains a set of grids, one for each queue in the purview of the user's contact center(s). In one embodiment, a queue is defined as a stream of contacts. Through the grouping of various call typed into various queues, the user identifies physically or logically separate loads upon the contact center. Each queue grid includes temporally indexed information on the following statistics: contact volume; percentage of volume distribution; average handling time; actual service level expected; required staff hours; and capacity staff hours. In addition, each queue has both a queue type and service goals that are set by the user.

The middle pane 206 contains a set of grids, one for each profile in the purview of the user's contact center(s). A profile is a collection of abstract agents that all share the same set of skills. Profiles are not necessarily unique. Each profile grid includes temporally indexed information on the following statistics: number hired; number in training; number transferred in from other profiles; number transferred out to other profiles; total head count; expected occupancy; and shrinkage rate. In addition, each profile has associated with it a set of skills or queues, an average wage and proficiency, and a breakout of the sources of shrinkage for members of the profile (e.g. unpaid absenteeism, paid shrinkage such as jury duty, etc.).

The lower pane 208 contains a single grid that summarizes a number of statistics in a temporally indexed fashion. The statistics include total contact volume, total number of hires, total head count, total staff hours, total cost, and total cumulative cost.

The left-most pane 202 contains folders of functionality, providing various tools within the folders. "Views" provides the ability to change views, selectively hiding and displaying arbitrary rows for all grids in the long-range planner. "Queues" provides the ability to edit Queue properties directly. "Profile" provides the ability to edit profile properties directly. "Wizards" provides the ability to launch Wizards that provide configuration support as well as intelligent advisors that guide the user through analytical best-practices in reducing contact center cost and increasing efficiency. "Events" provides the ability to annotate events and capture side effects of those events on contact center statistics.

Various functions of the long-range planner are implemented using various algorithms that will be described below. One function is an automated headcount and training forward calculator. The automated headcount and training forward calculator allows the user to instantly view the consequences of their hiring, training and transfer decisions on future head count. In one embodiment, the implementation is Java code that is triggered whenever the user makes changes to any of the following parameters of a long-range plan: the number of agents to be hired in a month; the attrition rate for one or more months; the number of agents that will transfer into or out of a profile; the initial headcount forecast going into the plan; and the amount of training time required to convert a newly hired or trained individual into a productive agent. When any such change is made, Java code carries forth a re-calculation of expected headcount throughout the rest of the plan for all affected profiles. This re-calculation is a mathematical formula involving summation based on all incoming agents to all profiles and subtraction based on all outgoing agents from all profiles. Training time is represented as a delay between the hiring of an agent and their addition to the effective head count.

The staff hours need calculator is another function. On a queue-by-queue and month-by-month basis, the staff hours need calculator computes the required number of staff hours in order to meet service level goals specified in the interface. This calculation has one further input: the distribution of contact volume over the course of an average day. The method described can be generalized to a greater or lesser resolution of distribution information including, for instance, distribution information for each week of a month and for each month in a year. The algorithm that computes staffing hours need begins with calculation of the number of Erlangs required for each time interval in order to satisfy demand within predetermined service goals. The resolution of this Erlang need calculation is tied directly to the resolution with which distribution information has been specified.

Given required Erlangs for all time intervals, summation of these Erlangs yields an estimate of total Erlangs and therefore total staff hours required for the entire planned demand. A discount factor may be used to denote relaxation of demand when local demand peaks are sharp and, therefore, induce high inefficiency if the demand is to be met perfectly.

Figure 3:
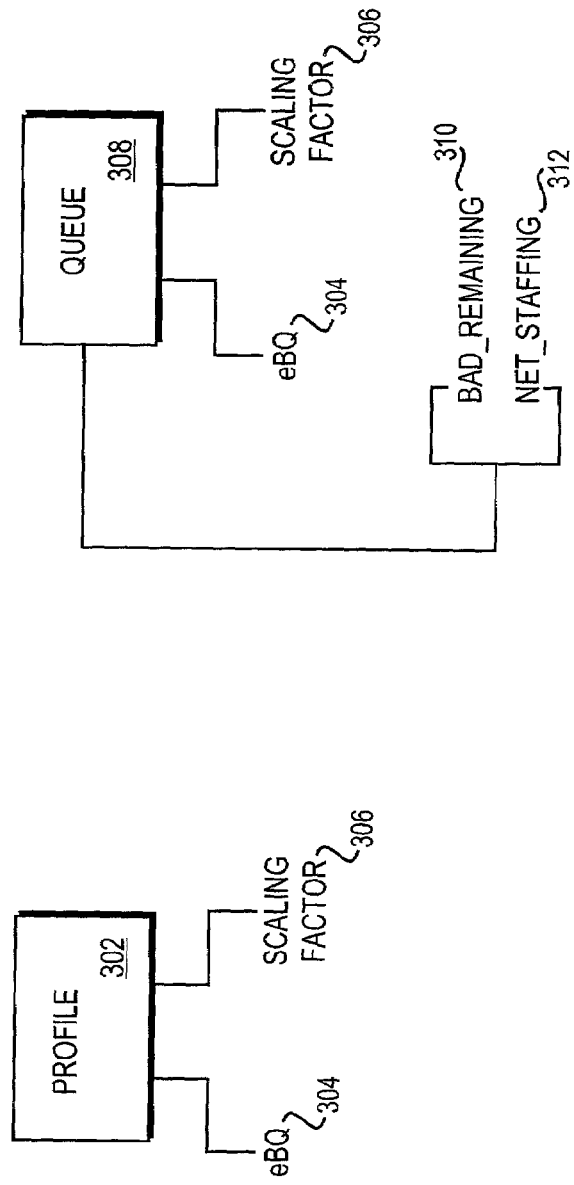
FIG. 3A is a block diagram of part of an embodiment of a discrete long-range planner.
FIG. 3B is a block diagram of another part of an embodiment of a discrete long-range planner.

Another function is a discrete long-range simulator that determines the total number of effective staffing hours of capacity provided for each queue and each time interval, based on the hiring and training plans specified to the long-range planner, along with the queue-by-queue load specified to the long range planner. The expected service level for each queue and the predicted occupancy for each queue are also determined for each profile, where occupancy is the number of agents servicing a queue. In one embodiment, with reference to FIGS. 3A and 3B, the discrete long-range simulator stores and updates values for both profiles and queues in alternation. For each profile 302 and each queue 308, a scaling factor 304 and an Erlang by queue (eBQ) factor are stored and updated. Both scaling factor 304 and eBQ factor 306 are arrays of length "numQueues".

Figure 4:
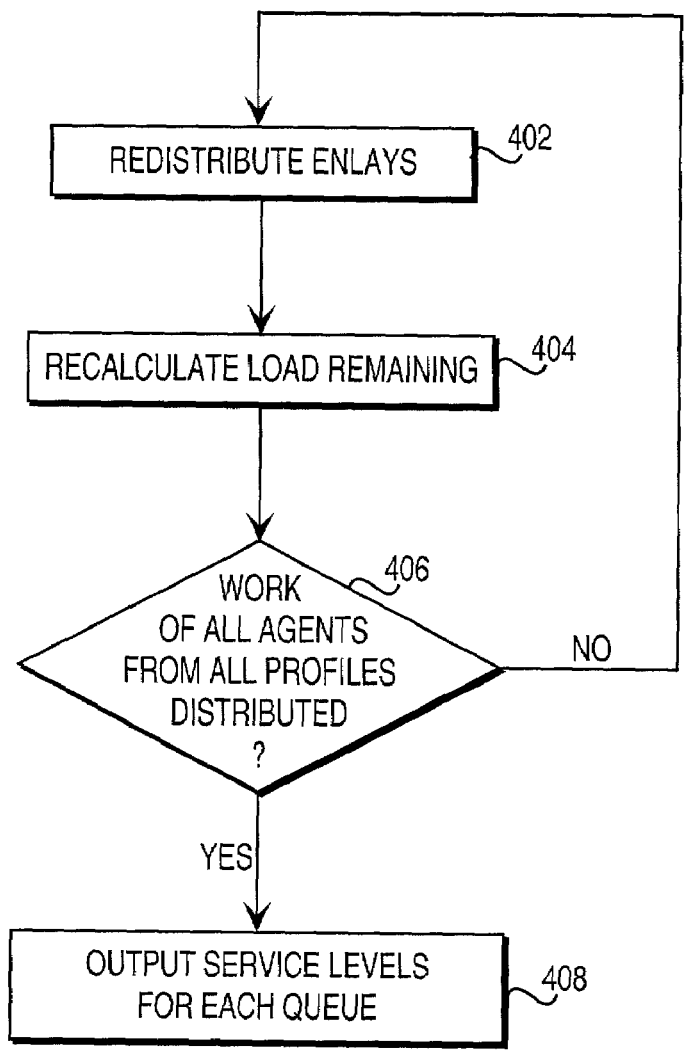
FIG. 4 is a block diagram of a part of an embodiment of a discrete long-range planner.

For each queue 308, a load_remaining 310 and a net_staffing 312 are stored and updated. Load_remaining 310 and net_staffing 312 are doubles. To calculate the service levels for each queue, iterative calculation is performed as described below and shown in FIG. 4. "Redistribute Erlangs" 402 and "recalculate load remaining" 404 are each executed iteratively until the work of agents from all profiles is distributed 406. When all of the work is distributed, a service level for each queue is output 408.

Redistribute Erlangs 402 updates the information stored for each profile. Initially, the load remaining for each queue is set to the load, and this is used to initially redistribute the Erlangs. This occurs as follows:

(1) For each profile, set the scaling for each queue(q) to $1.0-\text{alpha}^i)*\text{previous\_scaling}+\text{alpha}^i$ (q.bunching*q.load_remaining);

(2) Normalize scaling[ ]

(3) set eBQ[q]=scaling[q]*erlangsToContributeForThisProfile

ErlangsToContribute is headcount*hoursPerMonth*eTC (nq) where nq is the number of queues worked by this profile and eTC is a lookup table transforming, for each possible number of queues, a real-valued number between 0.0 and infinity representing the total effective Erlangs of work performed by a single agent. Previous_scaling is initialized to 0.0. Recalculate load remaining recalculates how much work is left to do. On a per queue basis, this occurs as follows:

For each queue (q)
net_staffing=\sum_profiles(p) p.eBQ[q];
localPCA=calculatePCA(net_staffing, seff, callRate, AHT, goalSeconds); load_remaining=[callVolume−(localPCA*callVolume)]*AHT;

At the completion of this iterative process, expected service levels have been computed for each queue, and the work of each profile's agents has been distributed accordingly. In order to compute occupancy, a second algorithm is then used as follows:

For each profile, set load to zero. Then, loop over each queue that the profile can answer and add the following to load:
percentage of netstaffing for this queue from this profile*load for this queue.
Set occupancy=load/headcount*hoursPerMonth
Then, bound occ by 1.0 above and by the highest occupancy on any of the queues (where occ is load/net_staffing) below.

Figure 5:
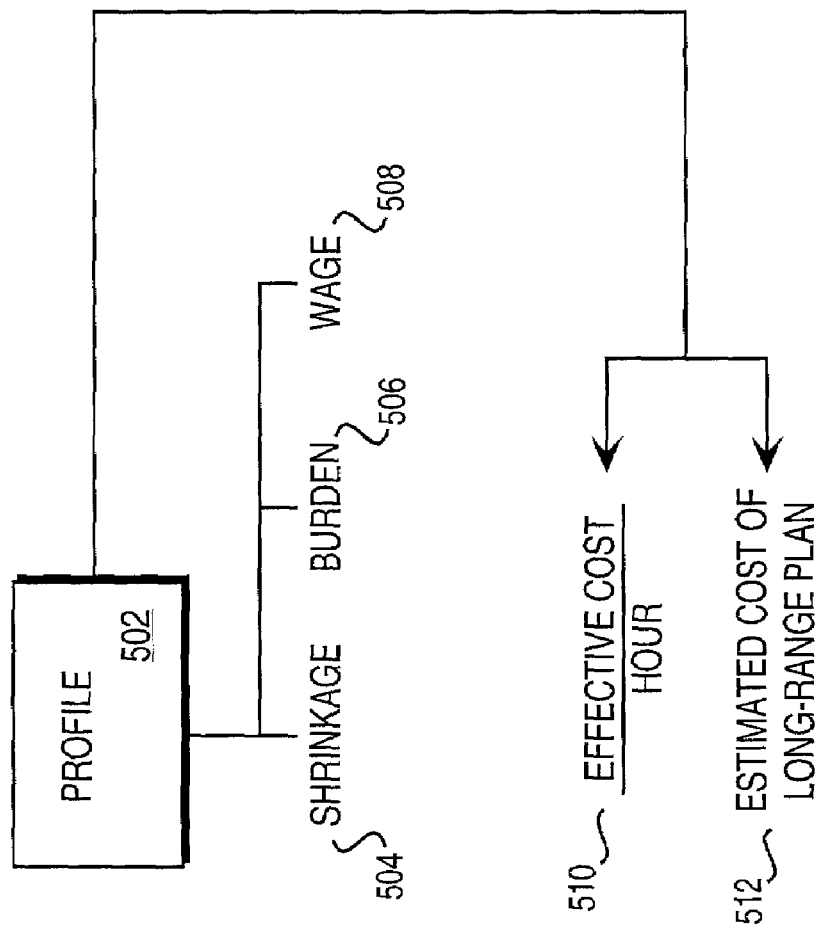
FIG. 5 is a block diagram of an embodiment of a cost model.

Another function of the long-range planner is a cost model. In one embodiment, the cost model is an interface that enables accurate prediction of contact center run cost using the inputs and calculations as described below and shown in FIG. 5. For each profile 502, the interface requests the user to specify shrinkage 504 in a series of categories as percentages of total time. One main category is planned shrinkage, which includes vacations, breaks, training, non-contact tasks, and other fields. The second main category is absenteeism. Absenteeism has subcategories, such as unpaid absenteeism, which includes fields such as unpaid sick time, unpaid personal time, and other fields. Another subcategory, paid absenteeism, includes the fields jury, FMLA (Family Medical Leave Act), and other fields. An algorithm computes the total unpaid absenteeism, denoted as "u", and the total shrinkage, which consists of a sum of the planned shrinkage and the unpaid and paid absenteeism.

In addition, the interface allows the user to specify an hourly wage 508 on a profile-by-profile basis. Finally, the interface allows the user to specify the total number of holiday days with varying degrees of temporal resolution, including monthly and yearly. Yet another aspect of the interface allows the user to specify burden in a field-by-field manner. A burden 506, also referred to as overhead, is specified as percentages, similar to shrinkage, for fields including 401K; insurance, worker's compensation, FUTA (Federal Unemployment Tax Act) and other fields.

The algorithm computes Paid/Work Ratio for each profile as:

$$((1-u)/(1-\text{total shrinkage}-\text{holidays}))$$

The Paid/Work Ratio is multiplied by the wage to yield the effective cost of each scheduled hour 510, which is one output of the cost model calculator. A further output, the estimated total cost of a long-range plan 512, is computed by multiplying the effective cost of each scheduled hour 510 by the total hours of work on a profile-by-profile basis.

Figure 6:
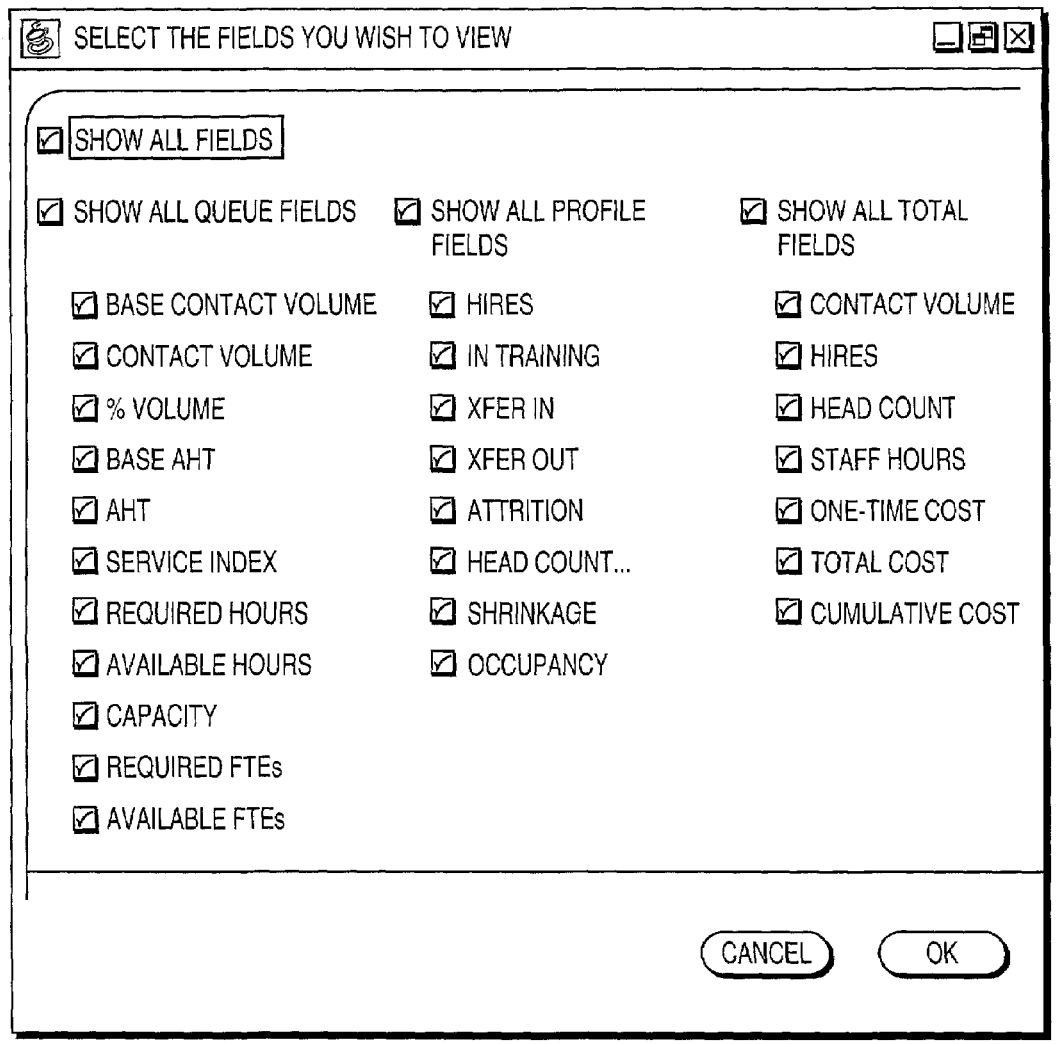
FIG. 6 is an illustration of a user interface screen for choosing fields to be displayed.
Figure 7:
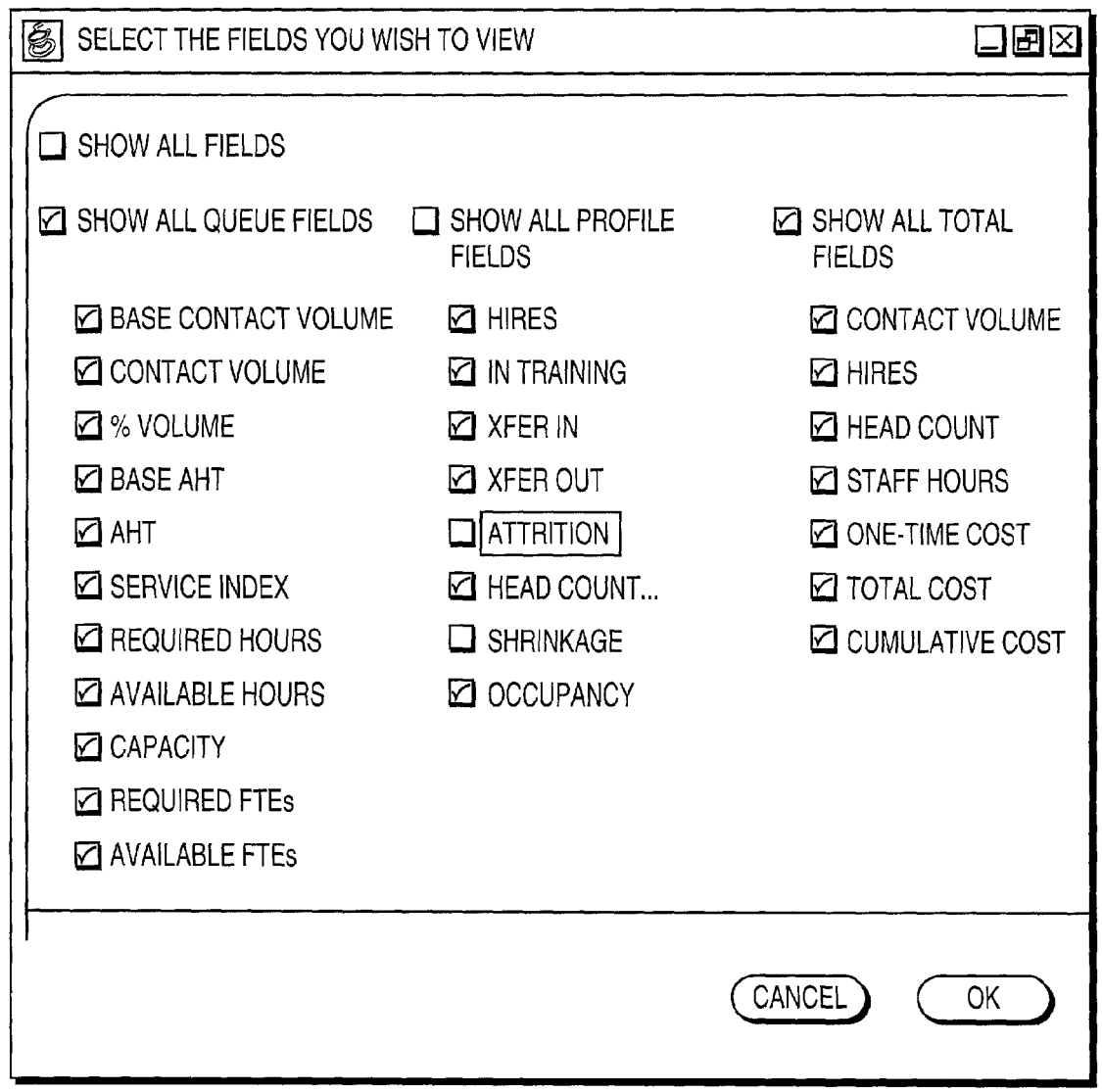
FIG. 7 is an illustration of a user interface screen for choosing fields to be displayed.

FIGS. 6 and 7 show user interface screens that allow the user to choose fields to be displayed. The fields available include various queue fields (base contact volume, contact volume, percent volume, etc.), various profile fields, and various "total" fields. In FIG. 6, all fields are selected, and the three "show all" boxes are checked. FIG. 7 shows that when the user deselects some of the fields, the appropriate "show all" field boxes are automatically updated.

Figure 8B:
FIG. 8A is an illustration of a user interface screen that allows tabbing between different scenarios. The screen shot continues in FIG. 8B.

Another function of the long-range planner is a comparator display that facilitates the use of data generated by the long-range planner. In order to enable what-if workflow, in which the user wishes to visually compare multiple long-range plan alternatives, one embodiment of a user interface includes tabs for viewing two long-range planner scenarios alternately. FIGS. 8A-8B show a user interface screen with tabs. The scenario corresponding to the left tab is displayed. FIGS. 9A-9B show a user interface screen in which the "new scenario" corresponding to the right tab is displayed.

In another embodiment, the comparator display includes a method for comparing multiple grids that have similar dimensionality on a single screen. Using column-major or row-major viewing formats, as indicated by the user, the comparator display interleaves any number of grids so that each Nth row or, alternatively, each Nth column of the resulting merged grid represents data from the Nth long-range plan alternative. In this manner, the user can compare multiple columns or rows of data from a single viewpoint. FIGS. 10A-10B show a display with interleaved column grids, and FIGS. 11A-11B show a display with interleaved row grids.

Variation in color and font are used to facilitate the user's discrimination of information from a first plan X with information from a second plan Y. In addition, a simple thresholdbased or statistically-based comparator can identify pairs of comparable information that are particularly different, and these values are colored and emphasized graphically so that they are particularly easy to recognize.

The comparator display can be used in any system. In particular, interleaving of columns or rows has general usefulness in the comparison of any set of grids, or arrays, with like semantics on some or all columns or rows.

Figure 12A:
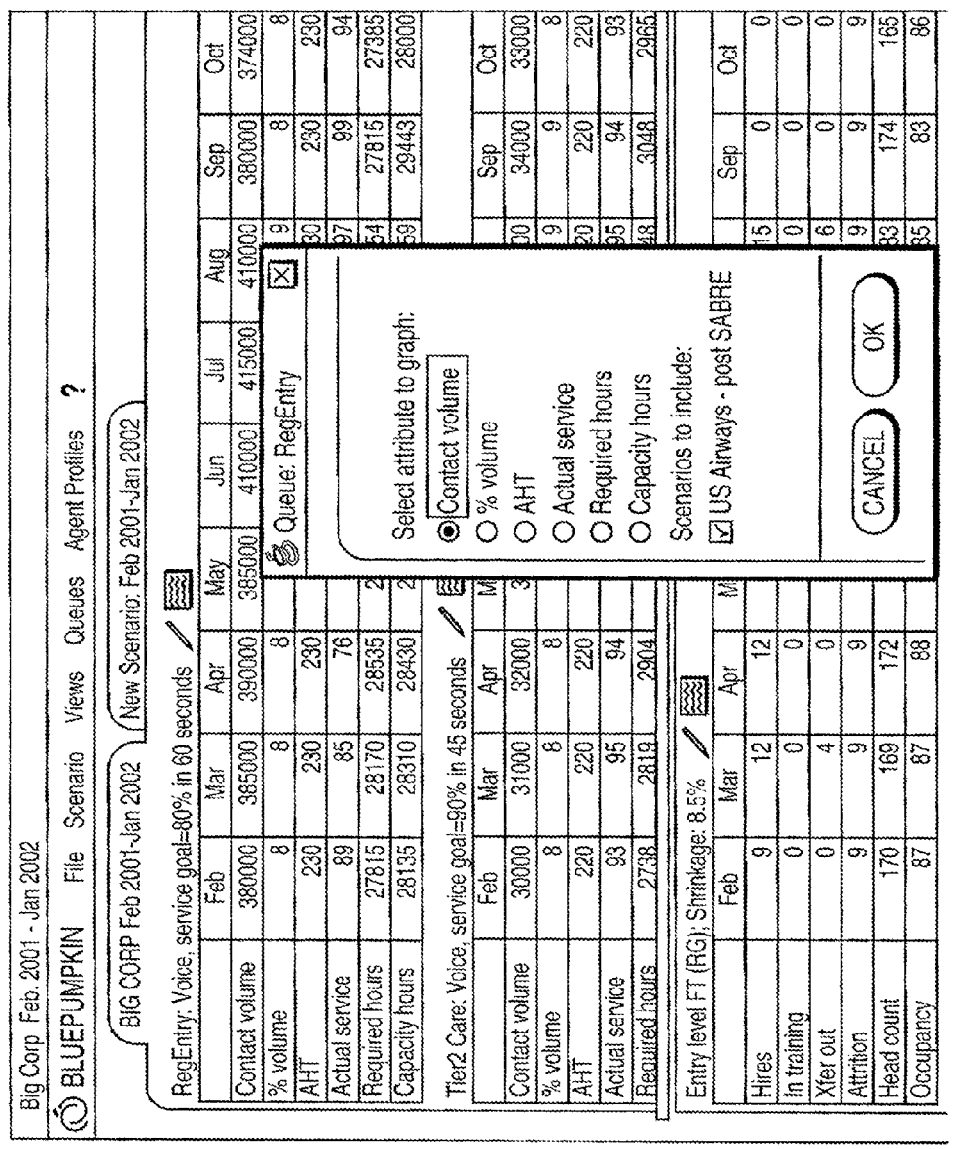
FIG. 12A is an illustration of a user interface screen including a graph application. The screen shot continues in FIG. 12B.
Figure 13B:
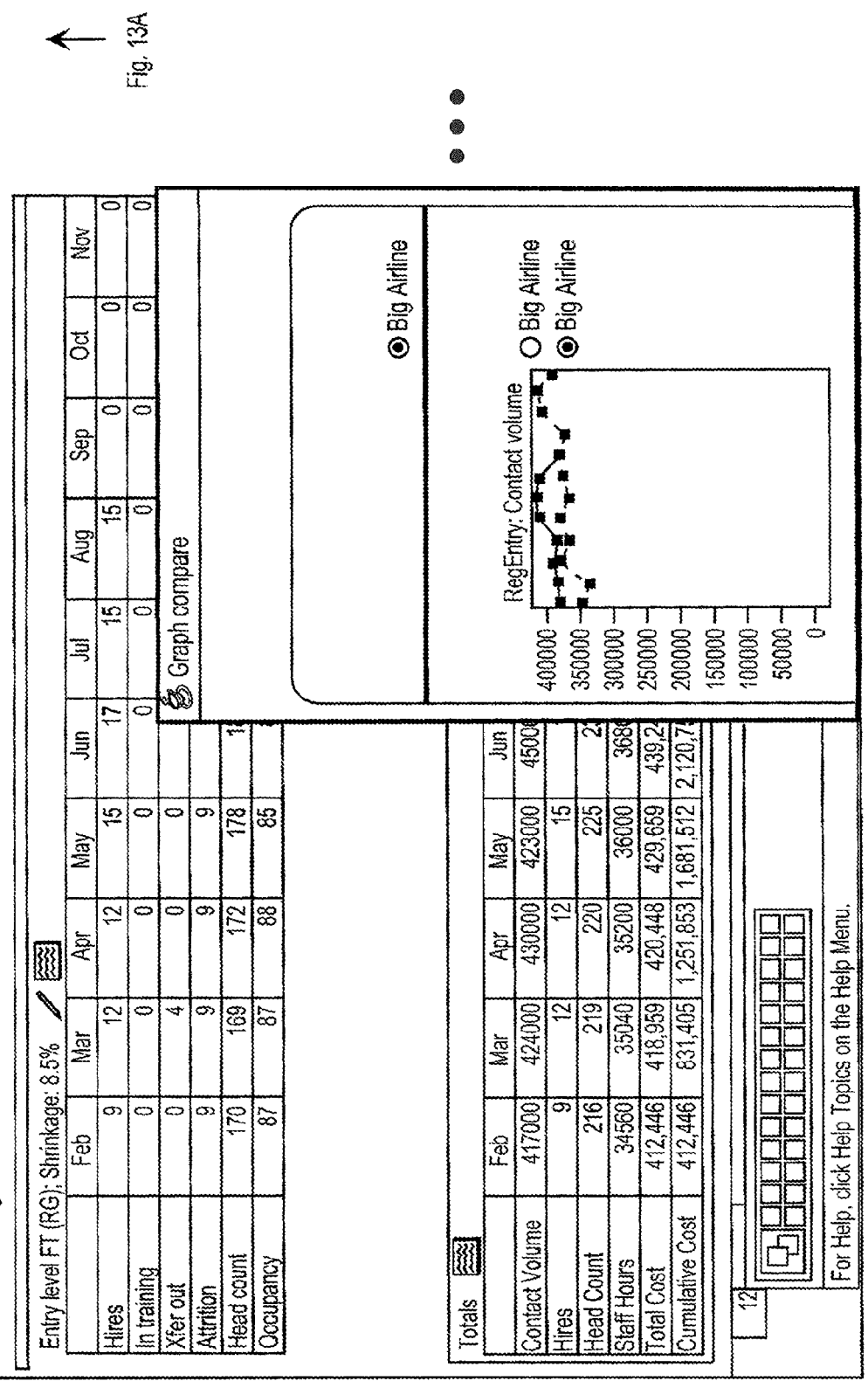
FIG. 13A is an illustration of a user interface screen including a graph application. The screen shot continues in FIG. 13B.
Figure 14B:
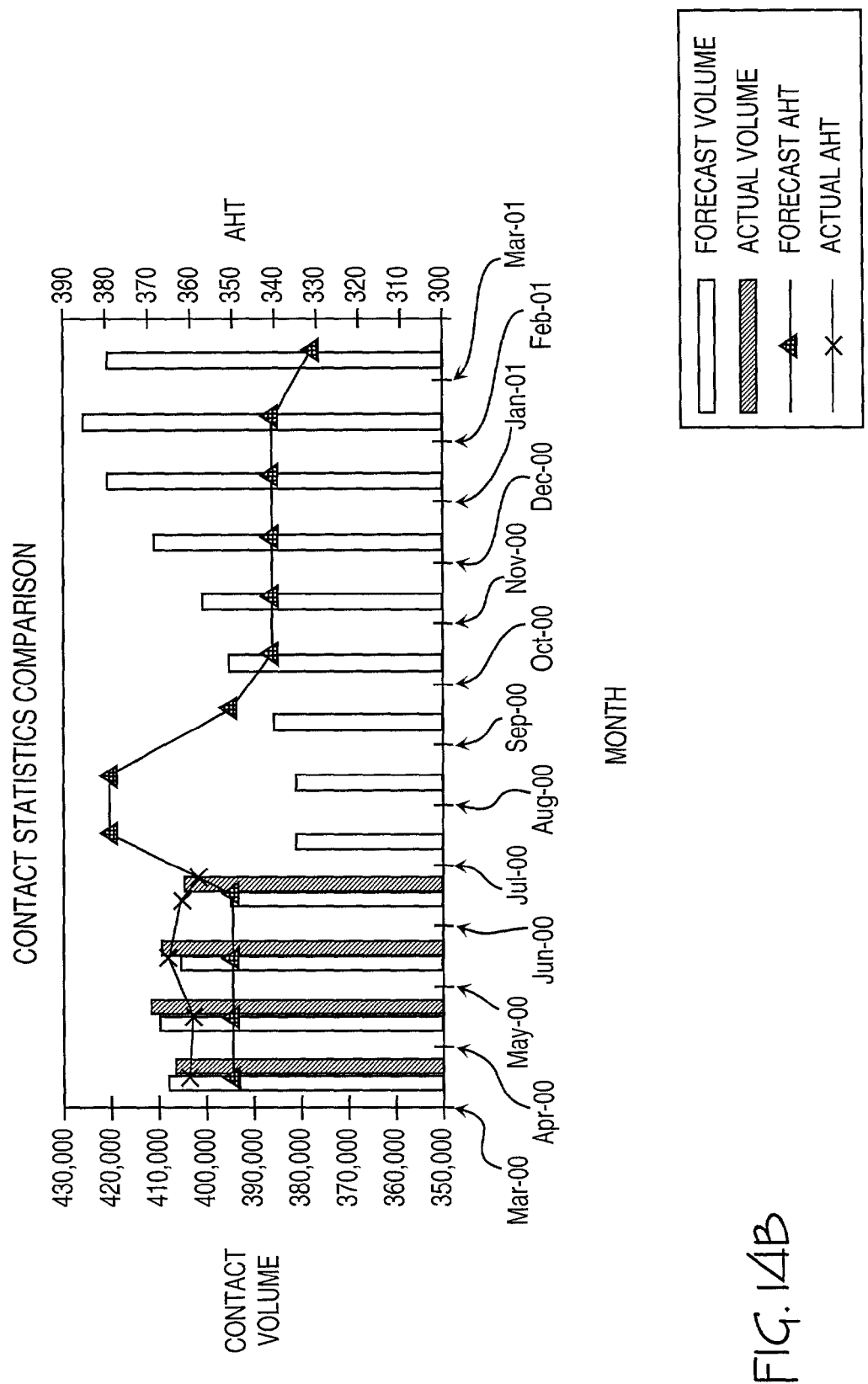
FIG. 14A is an illustration of a user interface screen including a performance summary report. The screen shot continues in FIGS. 14B-14D.
Figure 14C:
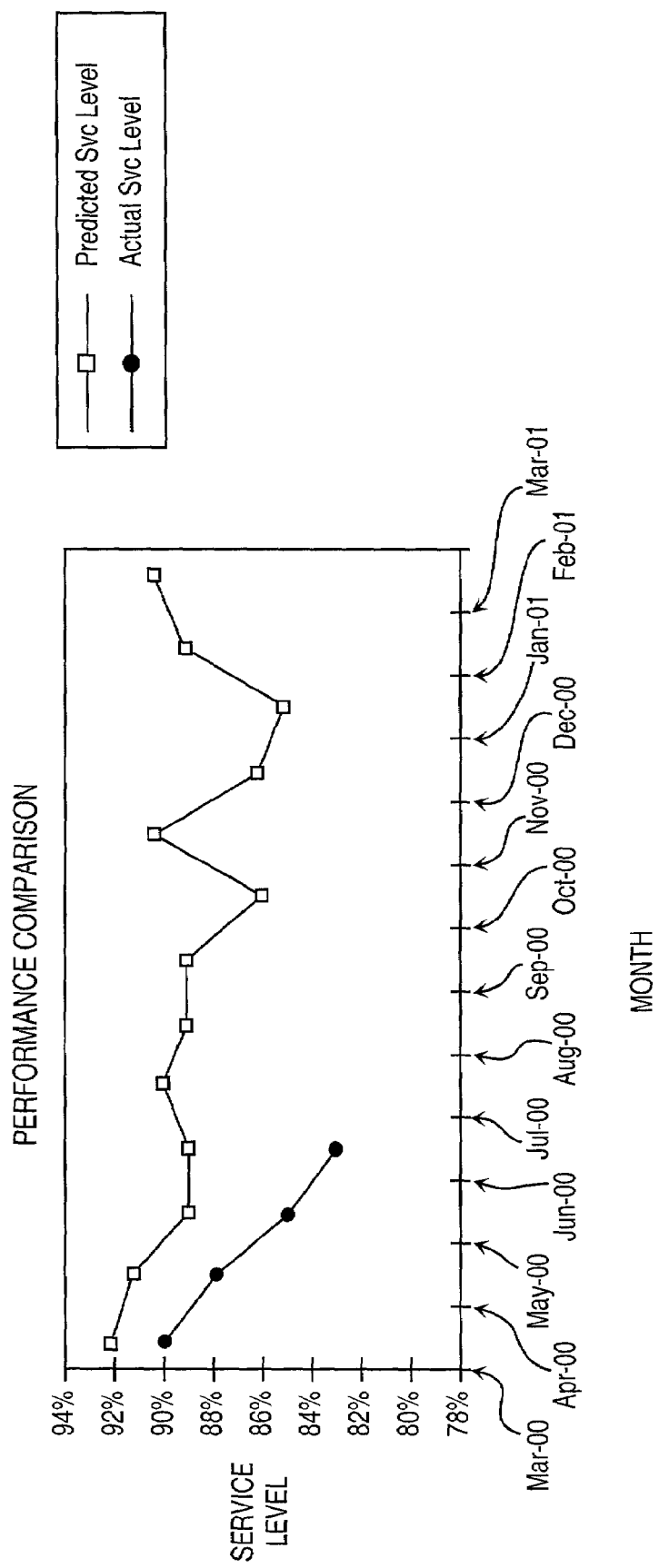
Figure 14D:
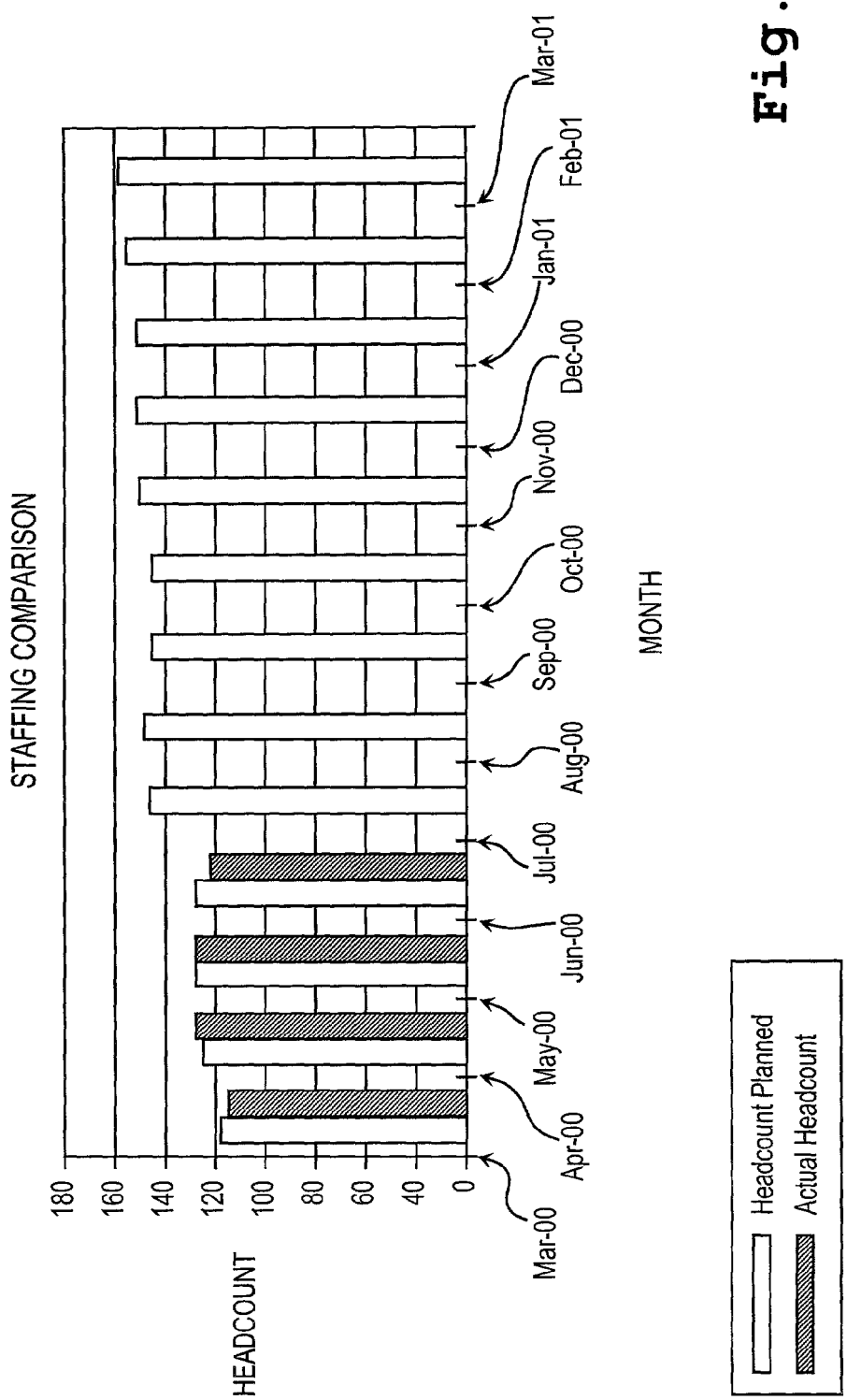

FIGS. 12A-12B and 13A-13B illustrate a graphing capability available in an embodiment of the user interface. FIGS. 12A-12B show the tabbed user interface screen in the background and a graph pop-up in the foreground. The user may select an attribute to graph and a scenario or scenarios to include in the graph. FIGS. 13A-13B show the background screen of FIGS. 12A-12B with a pop-up with the resulting graph. The graph shows contact volume for a chosen queue.

FIGS. 14A-14D are a user interface illustrating an aspect of the reporting capability available in an embodiment that coordinates with Excel™ to produce sophisticated, easy to read reports that include data produced by the long-range planner.

An interactive, intelligent Wizard is provided in one embodiment. As shown in FIGS. 2A-2B, Wizards are accessible to the user through the menu pane 202 of the main interface 200. The Wizards interacts with the user to guide the user through many of the functions of the long-range planner. A series of work-flows covering all of the major available activities of the long-range planner provide handheld best practices approaches for each individual activity. The Wizard provides direct hyperlinks with the continuation into the long-range planner. In complex parametric cases, the Wizard offers an alternative to filling out complex information directly. Instead, the Wizard offers a questionnaire; when the user completes the questionnaire the appropriate grid parameters are automatically specified. As shown in FIGS. 2A-2B, some of the activities available through the Wizards are creating a cost model, calculating accurate shrinkage, creating/adding a new agent profile, and creating/adding a new queue.

Figure 15:
FIG. 15 is an illustration of a user interface screen for creating a cost model in one embodiment.

FIGS. 15-21 illustrate interactions with the Wizards. FIGS. 15-20 illustrate interactions with configuration Wizards. FIGS. 15-17 illustrate creating a cost model. FIG. 15 shows an average wage screen in which the user can enter average wages for different agent profiles. FIG. 16 shows a burden screen in which the user can enter numbers reflecting the financial burden associated with agents. FIG. 17 shows a summary screen for the cost model, which displays cost data, all agent profiles together.

FIGS. 18 and 19 illustrate creating a new agent profile. FIG. 18 shows a general screen which allows the user to specify, on an agent profile basis, data such as agent efficiency, full time equivalent hours per month, hourly wage, initial headcount, and whether the profile can be hired into or transferred out of. FIG. 19 shows a shrinkage screen. The user can specify that the data entered relates to shrinkage per month or shrinkage for an entire long-range planning scenario. Percentages for planned shrinkage, unpaid absenteeism, and paid absenteeism can be entered. A total shrinkage number is generated for the profile.

Figure 20:
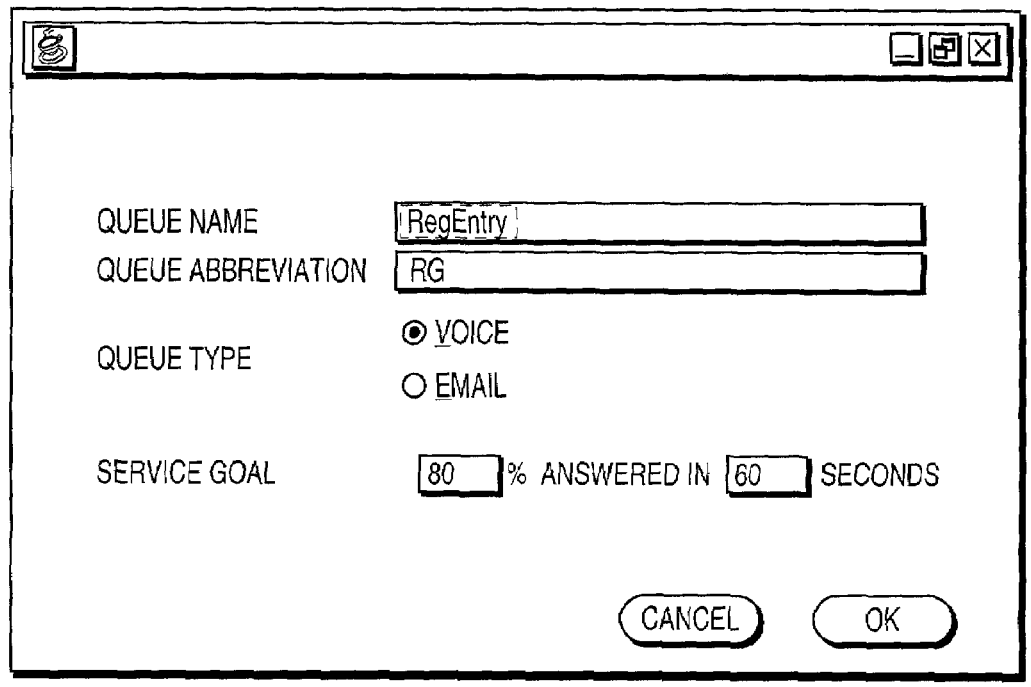
FIG. 20 is an illustration of a user interface screen for creating a queue in one embodiment.

FIG. 20 illustrates creating a new queue. The user specifies a queue name and abbreviation, a queue type (such as voice or email), and a service goal.

Figure 21:
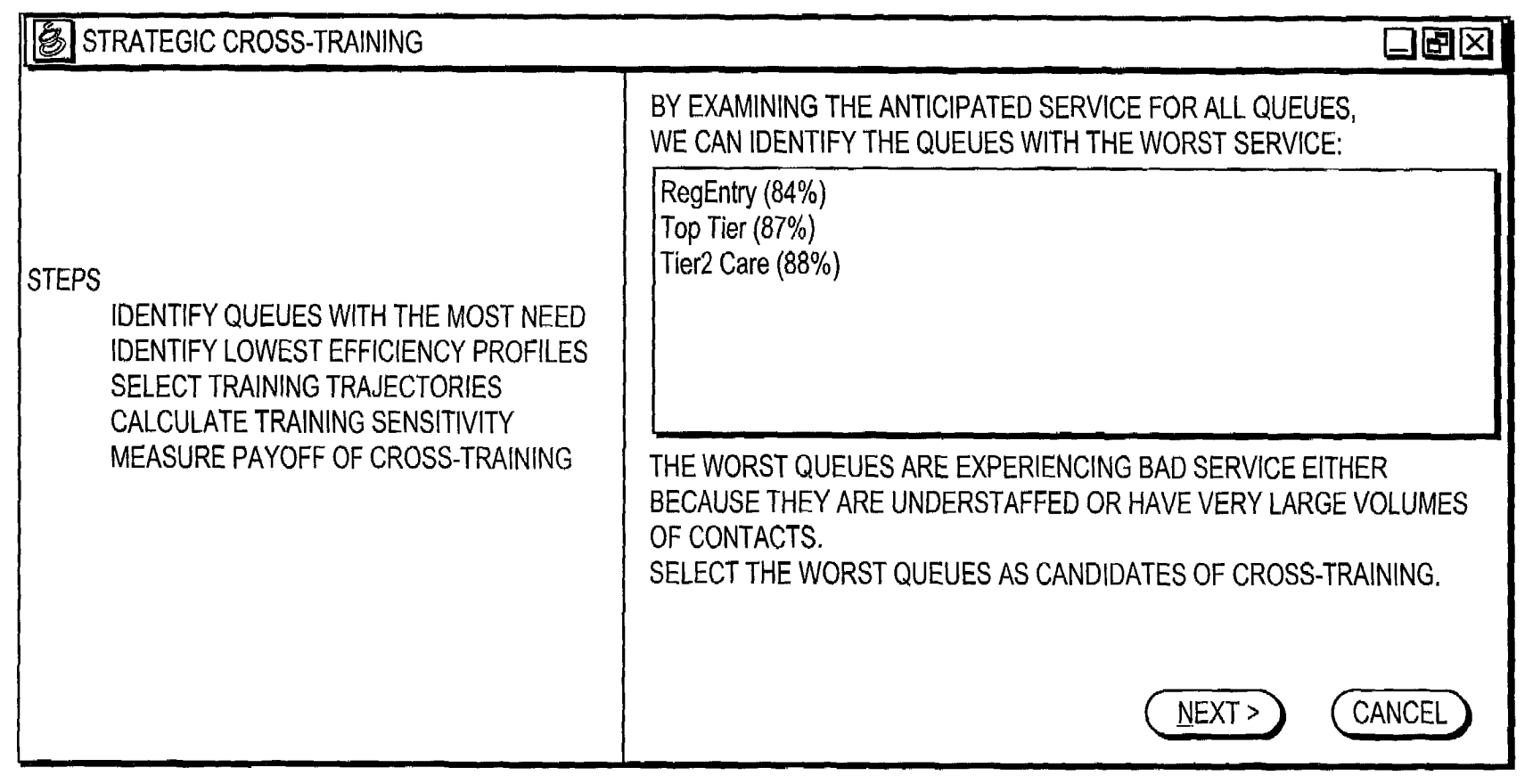

FIG. 21 illustrates an interaction with a Wizard that leads the user through steps to achieve a long-range plan objective of improving service levels. FIG. 21 shows a screen of a strategic cross-training Wizard process. On the left of the screen, the steps that will be followed are listed. The first step is identifying queues with the most need for cross-training. On the right of the screen, the Wizard is leading the user through the first step. The queues with the most need can be identified by examining all of the queues and identifying the ones with the worst service. The Wizard accesses the long-range planner to display the appropriate information, in this case, the performance percentages for the queues. The Wizard explains that the worst queues should be selected as candidates for cross-training. With Wizards, the user can develop a training plan and perform long-range planning to see the effects of the training. Thus the user has the capability to quickly and easily target performance problems and develop and test potential solutions through long-range planning.

A method for long-range planning for a complex system comprises defining at least one resource description, wherein a resource description comprises a group of resources that have similar characteristics, and wherein defining comprises specifying the characteristics, including at least one capability and at least one performance measure; defining at least one work load; specifying at least one criteria to be satisfied by a long-range staffing plan; and calculating an effect of applying the at least one resource description to the at least one work load, wherein the calculated effect includes at least one performance measure for the at least one work load, and an effective cost per hour.

The complex system may be a contact center. The at least one resource description may include an employee profile. The at least one work load may include a queue. The at least one capability may include a skill set. The at least one performance measure may include an efficiency percentage. Applying the at least one resource description to the at least one work load may include staffing the at least one queue with the at least one employee profile. The calculated effect may further include a queue occupancy for each queue, and an estimated cost of the long-range staffing plan.

The aforementioned calculating may comprise adding a first employee from the at least one profile to a proposed schedule, wherein there is an available work associated with each employee in the at least one profile, and wherein the proposed schedule is for servicing the at least one queue over a predefined time period; calculating an effect of adding the first employee, wherein adding an employee includes distributing the available work associated with the employee among the at least one queue; adding a next employee from the at least one profile to the proposed schedule; calculating an effect of adding the next employee taking into account the effect of having added the first employee; and iteratively adding additional employees to the proposed schedule and iteratively calculating effects of adding the additional employees taking into account each employee already added until the available work for every employee from the at least one profile has been distributed. The calculating the effect of adding the next employee may include redistributing available work among the at least one queue, and recalculating a workload remaining.

The aforementioned characteristics may further include: shrinkage, wherein shrinkage comprises various categories of time for which an employee is paid, but during which the employee does not work; burden, wherein burden comprises various categories of expenses associated with the employee, including benefit expenses; and wage. Specifying characteristics may further comprise specifying whether a profile may be hired into, and a time period required to bring an employee hired into the profile to a predefined level of efficiency.

The method for long-range planning for a complex system may further comprise displaying the calculated effect of the long-range staffing plan, comprising displaying for each queue of the at least one queue for each of a plurality of predefined time periods: a contact volume; a predefined average handling time goal; an actual service level; and a required service level. Displaying may further comprise displaying calculated effects of more than one staffing plan on a single display for comparison. The calculated effects of each of the more than one staffing plan may be arranged as rows and columns, and wherein displaying comprises placing corresponding rows from calculated effects of each of the more than one staffing plan in proximity to one another. The calculated effects of each of the more than one staffing plan may be arranged as rows and columns, and wherein displaying comprises placing corresponding columns from calculated effects of each of the more than one staffing plan in proximity to one another.

The estimated cost of the long-range staffing plan may include a training cost that reflects a period of time required for an employee to reach a predefined level of performance. The contact center may comprise multiple queues and multiple types of contact media, wherein the skill set includes skills across multiple queues and multiple contact media. Iteratively calculating effects of adding the additional employees taking into account each employee already added may include assigning additional employees across multiple queues and multiple contact media.

A system for long-range staffing planning in a contact center, wherein the multi-contact center processes a plurality of contact queues comprising a plurality of contact media, the system comprising: at least one server comprising at least one storage device; and at least one client processor coupled to the server through a network, wherein the client processor is coupled to a plurality of storage devices, including a storage device that stores instructions that, when executed, cause the at least one client processor to, receive a definition of at least one employee profile, wherein an employee profile comprises a group of employees that have similar characteristics, wherein the characteristics include a skill set and an efficiency percentage; receive a definition of at least one queue, wherein the at least one queue handles a plurality of contacts through a plurality of contact media; receiving a specification of at least one criteria to be satisfied by a long-range staffing plan; and calculating an effect of staffing the at least one queue with the at least one employee profile, wherein the calculated effect includes a service level for the at least one queue, and an effective cost per hour.

The calculated effect may further include a queue occupancy for each queue, and an estimated cost of the long-range staffing plan. Calculating may comprise adding a first employee from the at least one profile to a proposed schedule, wherein there is an available work associated with each employee in the at least one profile, and wherein the proposed schedule is for servicing the at least one queue over a predefined time period; calculating an effect of adding the first employee, wherein adding an employee includes distributing the available work associated with the employee among the at least one queue; adding a next employee from the at least one profile to the proposed schedule; calculating an effect of adding the next employee taking into account the effect of having added the first employee; and iteratively adding additional employees to the proposed schedule and iteratively calculating effects of adding the additional employees taking into account each employee already added until the available work for every employee from the at least one profile has been distributed.

Calculating the effect of adding the next employee may include redistributing available work among the at least one queue, and recalculating a workload remaining. The characteristics may further include: shrinkage, wherein shrinkage comprises various categories of time for which an employee is paid, but during which the employee does not work; burden, wherein burden comprises various categories of expenses associated with the employee, including benefit expenses; and wage. The characteristics may further include whether a profile may be hired into, and a time period required to bring an employee hired into the profile to a predefined level of efficiency.

The instructions, when executed, may further cause the at least one client processor to display the calculated effect of the long-rang staffing plan, comprising displaying for each queue of the at least one queue for each of a plurality of predefined time periods: a contact volume; a predefined average handling time goal; an actual service level; and a required service level. The system for long-range staffing planning in a contact center may further display calculated effects of more than one staffing plan on a single display for comparison as specified by a user.

The calculated effects of each of the more than one staffing plan may be arranged as rows and columns and, in response to the user specification, corresponding rows from calculated effects of each of the more than one staffing plan are displayed in proximity to one another. The calculated effects of each of the more than one staffing plan may be arranged as rows and columns, and, in response to the user specification, corresponding columns from calculated effects of each of the more than one staffing plan may be displayed in proximity to one another. The estimated cost of the long-range staffing plan may include a training cost that reflects a period of time required for an employee to reach a predefined level of performance.

Iteratively calculating effects of adding the additional employees taking into account each employee already added may include assigning additional employees across multiple queues and multiple contact media. The storage device that stores the instructions may be accessed by the at least one processor through the network. The storage device that stores the instructions may be the at least one storage device of the server.

An electromagnetic medium containing executable instructions which, when executed in a processing system, cause the system to generate effects of a proposed long-range staffing plan for a contact center, wherein generating comprises: defining at least one employee profile, wherein an employee profile comprises a group of employees that have the same skills, and wherein defining comprises specifying characteristics, including a skill set and an efficiency percentage; defining at least one queue; specifying at least one criteria to be satisfied by a long-range staffing plan; and calculating an effect of staffing the at least one queue with the at least one employee profile, wherein the calculated effect includes a service level for the at least one queue, and an effective cost per hour.

The calculated effect may further include a queue occupancy for each queue, and an estimated cost of the long-range staffing plan. Calculating may comprise adding a first employee from the at least one profile to a proposed schedule, wherein there is an available work associated with each employee in the at least one profile, and wherein the proposed schedule is for servicing the at least one queue over a predefined time period; calculating an effect of adding the first employee, wherein adding an employee includes distributing the available work associated with the employee among the at least one queue; adding a next employee from the at least one profile to the proposed schedule; calculating an effect of adding the next employee taking into account the effect of having added the first employee; and iteratively adding additional employees to the proposed schedule and iteratively calculating effects of adding the additional employees taking into account each employee already added until the available work for every employee from the at least one profile has been distributed.

Calculating the effect of adding the next employee may include redistributing available work among the at least one queue, and recalculating a workload remaining. The characteristics may further include: shrinkage, wherein shrinkage comprises various categories of time for which an employee is paid, but during which the employee does not work; burden, wherein burden comprises various categories of expenses associated with the employee, including benefit expenses; and wage. Specifying characteristics may further comprise specifying whether a profile may be hired into, and a time period required to bring an employee hired into the profile to a predefined level of efficiency.

The electromagnetic medium may contain further executable instructions which, when executed in a processing system, may cause the system to display the calculated effect of the long-rang staffing plan, comprising displaying for each queue of the at least one queue for each of a plurality of predefined time periods: a contact volume; a predefined average handling time goal; an actual service level; and a required service level. Displaying may further comprise displaying calculated effects of more than one staffing plan on a single display for comparison. The calculated effects of each of the more than one staffing plan may be arranged as rows and columns, and wherein displaying comprises placing corresponding rows from calculated effects of each of the more than one staffing plan in proximity to one another. The calculated effects of each of the more than one staffing plan may be arranged as rows and columns, and wherein displaying may comprise placing corresponding columns from calculated effects of each of the more than one staffing plan in proximity to one another.

The estimated cost of the long-range staffing plan may include a training cost that reflects a period of time required for an employee to reach a predefined level of performance. The contact center may comprise multiple queues and multiple types of contact media, wherein the skill set includes skills across multiple queues and multiple contact media. Iteratively calculating effects of adding the additional employees taking into account each employee already added may include assigning additional employees across multiple queues and multiple contact media.

A method and apparatus for long-range planning have been described with reference to particular embodiments and examples. Various modifications in approach and application are possible without departing from the spirit and scope of the invention, which is defined by the following claims.

The invention claimed is:

1. A computer-implemented method for determining at least one effect of an agent staffing plan for a long-range period that is more than a month in the future, comprising:
   receiving, at a computer, a definition for each of a plurality of agent profiles comprising a group of agents that have similar characteristics, and wherein the definition includes the similar characteristics, including at least one skill, at least one performance measure, and at least one attribute specifying an amount of change in the number of agents in the group during a specified time period, wherein there is an available work associated with each agent in each of the agent profiles;
   defining a plurality of work loads;
   specifying at least one criteria to be satisfied by a long-range staffing plan, wherein the plan covers a period that is more than a month in the future; and
   calculating at least one effect of applying the plurality of agent profiles to the plurality of work loads while satisfying the at least one criteria, wherein the calculated effect includes at least one performance measure for the plurality of work loads, wherein the calculation is performed by a computer,
   wherein the calculating comprises:
      adding a first agent from one of the agent profiles to a proposed schedule, wherein the proposed schedule is for servicing the plurality of work loads over a predefined time period;
      after adding the first agent, calculating an effect of adding the first agent as if the first agent is the only agent being added, wherein adding the first agent includes distributing the available work associated with the first agent among the plurality of work loads;
      after calculating the effect of adding the first agent, adding an another agent from one of the agent profiles to the proposed schedule;
      after adding the another agent, calculating an effect of adding the another agent as if the another agent is the only agent that will be added; and
      alternately adding agents and calculating effects comprising: adding additional other agents from the agent profiles to the proposed schedule one at a time and calculating the effects of adding the additional other agents one at a time as if each additional other agent is the only agent that will be added until the available work for every agent in the plurality of agent profiles has been distributed.

2. The method of claim 1, wherein the complex system is a contact center, the plurality of work loads includes at least one queue, and wherein the at least one capability includes a skill set.

3. The method of claim 2, wherein the at least one performance measure includes an efficiency percentage, and wherein applying the plurality of agent profiles to the plurality of work loads includes staffing the at least one queue with the at least one agent profile.

4. The method of claim 3, wherein the characteristics further include:
   shrinkage, wherein shrinkage comprises various categories of time for which an employee is paid, but during which the agent does not work;
   burden, wherein burden comprises various categories of expenses associated with the agent including benefit expenses; and
   wage.

5. The method of claim 3, wherein specifying characteristics further comprises specifying whether the profile may be hired into, and a time period required to bring an agent hired into the profile to a predefined level of efficiency.

6. The method of claim 3, further comprising displaying the calculated effect of the long-range staffing plan, comprising displaying for each queue of the at least one queue for each of a plurality of predefined time periods:
   a contact volume;
   a predefined average handling time goal;
   an actual service level; and
   a required service level.

7. The method of claim 1, wherein the calculated effect further includes an estimated cost of the long-range staffing plan, and wherein the estimated cost of the long-range staffing plan includes a training cost that reflects a period of time required for an employee to reach a predefined level of performance.

8. The method of claim 1, wherein the contact center comprises multiple queues and multiple types of contact media, wherein the skill set includes skills across multiple queues and multiple contact media.

9. The method of claim 8, wherein calculating the effects of adding the additional other agents includes assigning additional other agents across multiple queues and multiple contact media.

10. A system for determining at least one effect of an agent staffing plan for a long-range period that is more than a month in the future, wherein the multi-contact center processes a plurality of contact queues comprising a plurality of contact media, the system comprising:
- at least one server comprising at least one storage device; and
- at least one client processor coupled to the server through a network, wherein the client processor is coupled to a plurality of storage devices, including a storage device that stores instructions that, when executed, cause the at least one client processor to,
- receive a definition of at least one employee profile, wherein an employee profile comprises a group of employees that have similar characteristics, wherein the characteristics include a skill set and an efficiency percentage, and at least one attribute specifying a change in the number of employees in the group during a specified time period;
- receive a definition of a plurality of queues, wherein at least one queue of the plurality of queues handles a plurality of contacts through a plurality of contact media;
- receive a specification of at least one criteria to be satisfied by a long-range staffing plan, wherein the plan covers a period that is more than a month in the future; and
- calculate at least one effect of staffing the plurality of queues with the at least one employee profile while satisfying the at least one criteria, wherein the calculated effect includes a service level for the plurality of queues,
- wherein calculating comprises:
  - adding a first employee from the at least one profile to a proposed schedule, wherein the proposed schedule is for servicing the plurality of queues over a predefined time period;
  - after adding the first employee, calculating an effect of adding the first employee while considering the first employee to be the only employee from the at least one profile that is added, wherein adding the first employee includes distributing the available work associated with the first employee among the plurality of queues;
  - after calculating the effect of adding the first employee, adding an another employee from the at least one profile to the proposed schedule;
  - after adding the another employee, calculating an effect of adding the another employee as if the another employee is the only employee that will be added; and
  - alternately adding employees and calculating effects comprising: adding additional employees from the at least one profile to the proposed schedule one at a time and calculating effects of adding each additional employee while considering each additional employee as if that additional employee is the only employee that will be added until available work for every employee from the at least one profile has been distributed.

11. The system of claim 10, wherein the calculated effect further includes a queue occupancy for each queue of the plurality of queues, and an estimated cost of the long-range staffing plan.

12. The system of claim 10, wherein the characteristics further include:
- shrinkage, wherein shrinkage comprises various categories of time for which an employee is paid, but during which the employee does not work;
- burden, wherein burden comprises various categories of expenses associated with the employee, including benefit expenses; and
- wage.

13. The system of claim 10, wherein the characteristics further include whether the profile may be hired into, and a time period required to bring an employee hired into the profile to a predefined level of efficiency.

14. The system of claim 10, wherein the instructions, when executed, further cause the at least one client processor to display the calculated effect of the long-range staffing plan, comprising displaying for each queue of the plurality of queues for each of a plurality of predefined time periods:
- a contact volume;
- a predefined average handling time goal;
- an actual service level; and
- a required service level.

15. The system of claim 11, wherein the estimated cost of the long-range staffing plan includes a training cost that reflects a period of time required for an employee to reach a predefined level of performance.

16. The system of claim 10, wherein calculating effects of adding each additional employee includes assigning additional employees across multiple queues and multiple contact media.

17. An electromagnetic medium containing executable instructions which, when executed in a processing system, cause the system to generate effects of a proposed long-range staffing plan for a long-range period that is more than a month in the future, wherein generating comprises:
- defining at least one employee profile, wherein an employee profile comprises a group of employees that have the same skills, and wherein defining comprises specifying characteristics, including a skill set, an efficiency percentage, and at least one attribute specifying a change in the number of employees in the group during a specified time period;
- defining a plurality of queues;
- specifying at least one criteria to be satisfied by a long-range staffing plan; and
- calculating at least one effect of staffing the plurality of queues with the at least one employee profile while satisfying the at least one criteria, wherein the calculated effect includes a service level for the plurality of queues, wherein the calculating comprises:
  - adding a first employee from the at least one profile to a proposed schedule, wherein the proposed schedule is for servicing the plurality of queues over a predefined time period, wherein adding the first employee includes distributing available work associated with the first employee among the plurality of queues;
  - after adding the first employee, calculating an effect of adding the first employee, while considering the addition of the first employee to be independent of adding any other employees from the at least one profile;
  - after calculating the effect of adding the first employee, adding an another employee from the at least one profile to the proposed schedule;

after adding the another employee, calculating an effect of adding the another employee taking into account the effect of having added the first employee; and alternately adding employees and calculating effects comprising: adding additional employees from the at least one profile to the proposed schedule one at a time and calculating effects of adding each additional employee while considering the addition of each additional employee to be independent of adding any other employees from the at least one profile until available work for every employee from the at least one profile has been distributed.

18. The electromagnetic medium of claim 17, wherein the calculated effect further includes a queue occupancy for each of the plurality of queues, and an estimated cost of the long-range staffing plan.

19. The electromagnetic medium of claim 17, wherein calculating the effect of adding the another employee includes redistributing available work among the plurality of queues, and recalculating a workload remaining.

20. The electromagnetic medium of claim 17, wherein the characteristics further include:
   shrinkage, wherein shrinkage comprises various categories of time for which an employee is paid, but during which the employee does not work;
   burden, wherein burden comprises various categories of expenses associated with the employee, including benefit expenses; and
   wage.

21. The electromagnetic medium of claim 17, wherein specifying characteristics further comprises specifying whether a profile may be hired into, and a time period required to bring an employee hired into the profile to a predefined level of efficiency.

22. The electromagnetic medium of claim 17, further comprising displaying the calculated effect of the long-range staffing plan, comprising displaying for each of the plurality of queues for each of a plurality of predefined time periods:
   a contact volume;
   a predefined average handling time goal;
   an actual service level; and
   a required service level.

23. The electromagnetic medium of claim 18, wherein the estimated cost of the long-range staffing plan includes a training cost that reflects a period of time required for an employee to reach a predefined level of performance.

24. The electromagnetic medium of claim 17, wherein the contact center comprises multiple queues and multiple types of contact media, wherein the skill set includes skills across multiple queues and multiple contact media.

25. The electromagnetic medium of claim 24, wherein calculating effects of adding the additional employees includes assigning additional employees across multiple queues and multiple contact media.

26. The method of claim 1, wherein the plurality of workloads comprises a plurality of queues, wherein each queue is associated with a remaining load and a net staffing, wherein each agent profile is associated with a plurality of Erlang-by-queue factors, and wherein the calculating further comprises:
   redistributing work among the agent profiles by computing the plurality of Erlang-by-queue factors for each agent profile;
   recalculating load remaining for each of the plurality of queues by computing the net staffing and remaining load associated with each queue of the plurality of queues; and
   repeating the redistributing work and recalculating load steps until the available work of agents in all agent profiles has been distributed.

27. The method of 26, wherein each agent profile further is associated with a headcount, an hours-per-month, a number of queues worked by the profile, a total effective Erlangs performed by one agent in the agent profile, and wherein the redistributing work step further comprises:
   redistributing work among the agent profiles by computing the plurality of Erlang-by-queue factors for each agent profile based on the associated headcount, the hours-per-month, the number of queues worked by the profile, and the total effective Erlangs.

28. The method of 27, wherein each queue is further associated with a bunching variable, wherein each profile is further associated with a plurality of queue scaling factors, and computing the plurality of Erlang-by-queue factors for each agent profile further comprises:
   computing each queue scaling factor based on the corresponding queue bunching variable, the corresponding queue remaining load, and a previous scaling factor;
   computing an Erlangs-to-Contribute for the agent profile based on the associated agent profile headcount, hours-per-month, and number of queues worked by the profile; and
   computing each of the plurality of Erlang-by-queue factors by multiplying the corresponding queue scaling factor by the computed Erlangs-to-contribute.

29. The method of 26, wherein each queue is further associated with an expected service level, a call volume, an average handle time, a remaining load and a net staffing, and wherein the recalculating load step further comprises:
   recalculating load remaining for each of the plurality of queues by computing the net staffing and remaining load associated with each queue, wherein the net staffing is produced by summing across all profiles the Erlang-by-queue factor of the queue being computed, and wherein the remaining load is based on the queue call volume, the queue average handle time, and the queue expected service level.

30. The method of 29, wherein the recalculating load step further comprises:
   calculating the queue expected service level based on the queue net staffing, the queue average handle time, a queue call rate, and a queue goal-seconds.

31. The method of 26, wherein each queue is associated with an occupancy, wherein agent profile is further associated with a load and an hours-per-month, and further comprising the steps of:
   initializing each agent profile load to zero;
   for each agent profile, iterating through each queue for which the profile is set to answer and adding to the agent profile load the remaining load associated with the iterated queue, multiplied by a percentage of the net staffing associated with the iterated queue to which the agent profile contributes; and
   for each agent profile, computing the agent profile occupancy by dividing the agent profile load by the agent profile headcount multiplied by the agent profile hours-per-month.

32. The method of 31, further comprising the steps of:
   computing an occupancy for each queue by dividing queue remaining load by queue net staffing; and
   for each agent profile, bounding the agent profile occupancy by the highest value of queue occupancy in the plurality of queues.

33. The method of claim 1, wherein the at least one attribute specifies the number of expected agent hires in the long-range period.

34. The method of claim 1, wherein the at least one attribute specifies the expected agent attrition in the long-range period.

35. The method of claim 1, wherein the at least one attribute specifies the expected number of agents leaving one agent profile to be trained in another agent profile.

36. The system of claim 10, wherein calculating an effect of adding the first employee further comprises calculating the effect of adding the first employee independent of adding any other employees, and wherein calculating an effect of adding each additional employee further comprises calculating the effect of adding each additional employee independent of adding any other employees.

37. The system of claim 10, wherein the at least one attribute specifies the number of expected employee hires in the long-range period.

38. The system of claim 10, wherein the at least one attribute specifies the expected employee attrition in the long-range period.

39. The system of claim 10, wherein the at least one attribute specifies an expected number of employees leaving one employee profile to be trained in another employee profile.

40. The electromagnetic medium of claim 17, wherein the at least one attribute specifies the expected employee attrition in the long-range period.

41. The electromagnetic medium of claim 17, wherein the at least one attribute specifies an expected number of employees leaving one employee profile to be trained in another employee profile.

* * * * *